(12) United States Patent
Shimizu et al.

(10) Patent No.: US 7,377,194 B2
(45) Date of Patent: May 27, 2008

(54) WORM GEAR MECHANISM AND ELECTRIC POWER STEERING APPARATUS EQUIPPED WITH THE WORM GEAR MECHANISM

(75) Inventors: Yasuo Shimizu, Wako (JP); Katsuji Watanabe, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 750 days.

(21) Appl. No.: 10/824,262

(22) Filed: Apr. 13, 2004

(65) Prior Publication Data

US 2004/0221669 A1 Nov. 11, 2004

(30) Foreign Application Priority Data

Apr. 15, 2003 (JP) ............................. 2003-110742
Mar. 2, 2004 (JP) ............................. 2004-057802

(51) Int. Cl.
*B62D 5/24* (2006.01)
*F16H 55/24* (2006.01)

(52) U.S. Cl. ...................... 74/409; 74/388 PS; 74/425

(58) Field of Classification Search ............ 74/388 PS, 74/409, 425, 440, 89.14, 458
See application file for complete search history.

(56) References Cited

U.S. PATENT DOCUMENTS 5,934,144 A 8/1999 Marinkovic
6,354,395 B1 3/2002 Cheng et al.

FOREIGN PATENT DOCUMENTS

| DE | 544 445 C | 2/1932 |
| GB | 1 546 785 | 5/1975 |
| JP | 2001-355700 | 12/2001 |
| JP | 2002-37100 | 2/2002 |

*Primary Examiner*—Willam C Joyce
(74) *Attorney, Agent, or Firm*—Hamre, Schumann, Mueller & Larson, P.C.

(57) ABSTRACT

Worm gear mechanism is provided which includes a worm, a torque-transmitting worm wheel and an auxiliary worm wheel. In order to secure a sufficient face width of the torque-transmitting worm wheel, a pitch diameter of the auxiliary worm wheel is set to be greater than a pitch diameter of the torque-transmitting worm wheel. Thus, undesired backlash can be eliminated by the auxiliary worm wheel meshing with the worm with a different meshing phase from the torque-transmitting worm wheel.

6 Claims, 20 Drawing Sheets

FIG.6A
FIG.6B
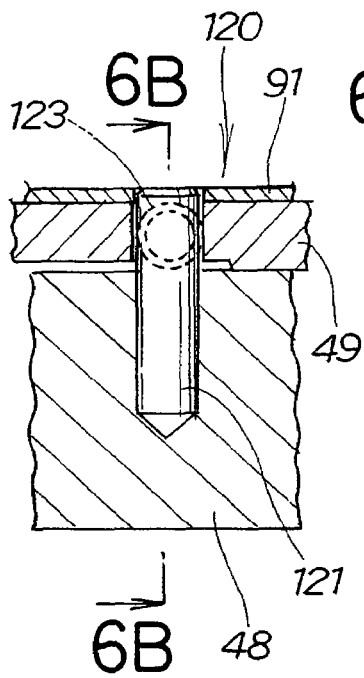
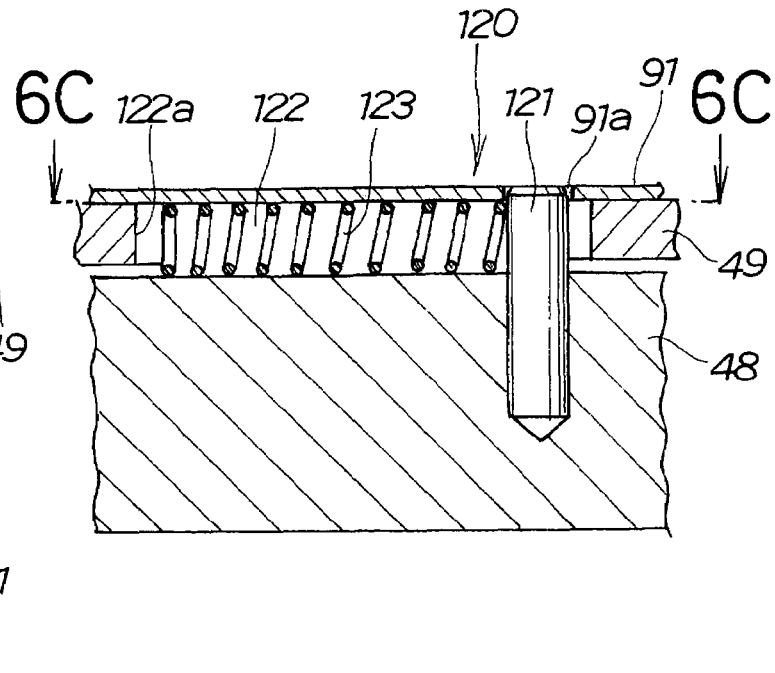
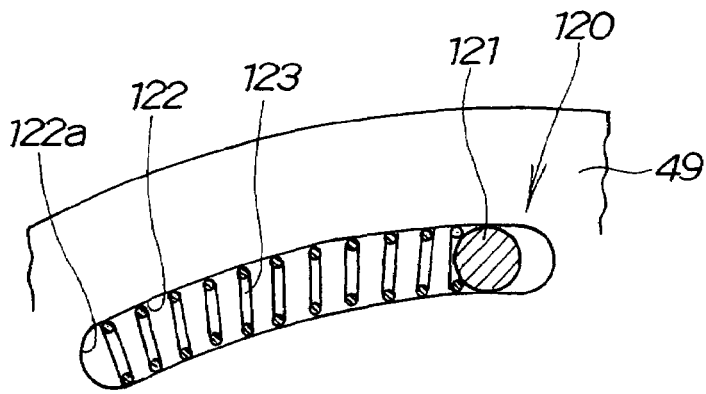
FIG.6C
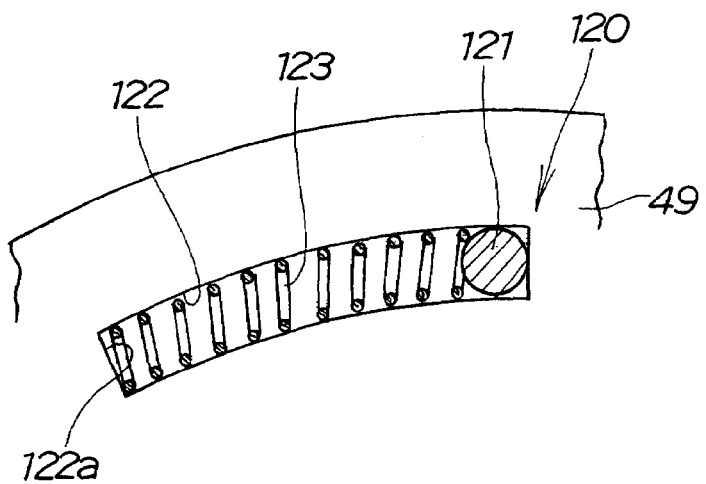
FIG.6D

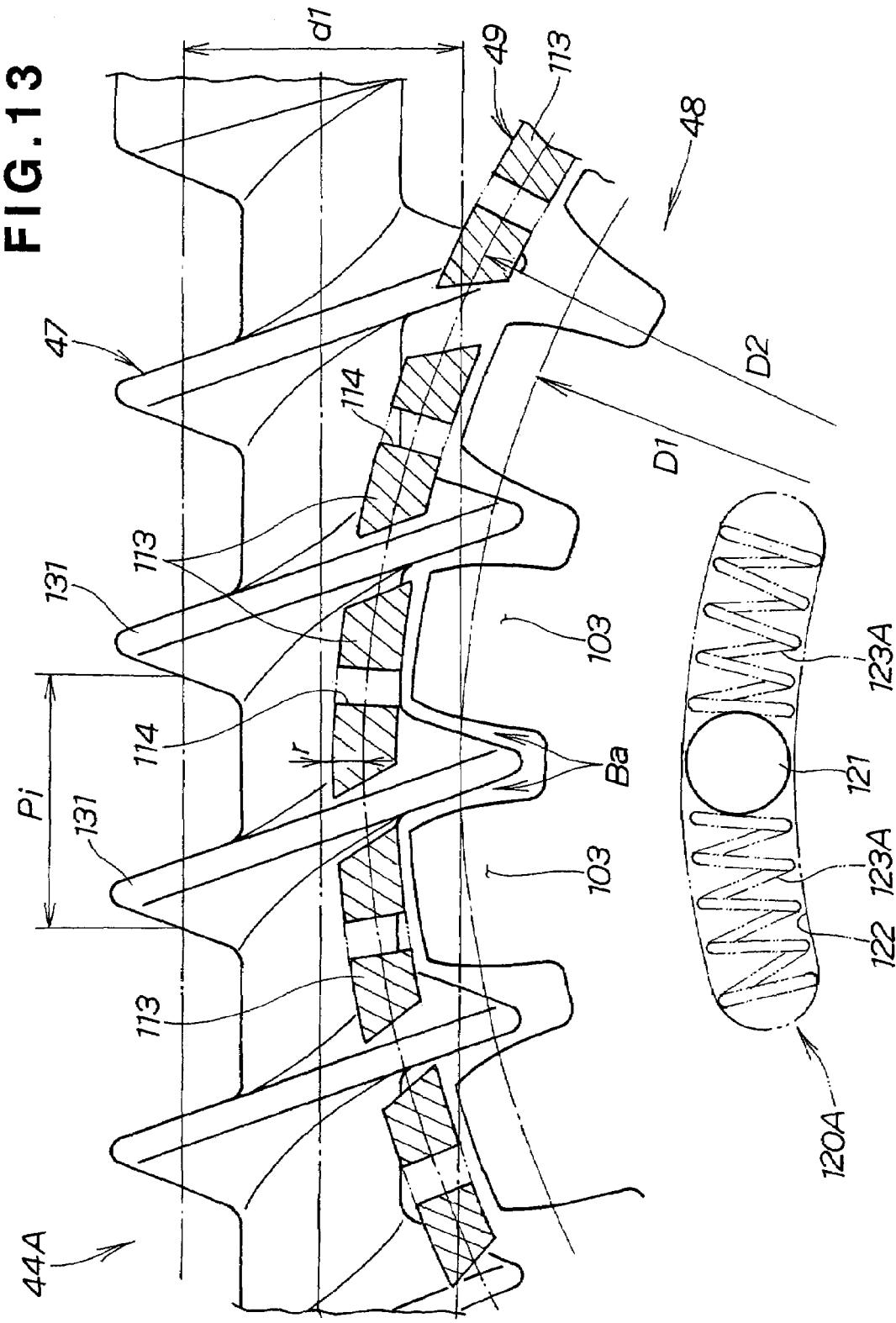

(b)

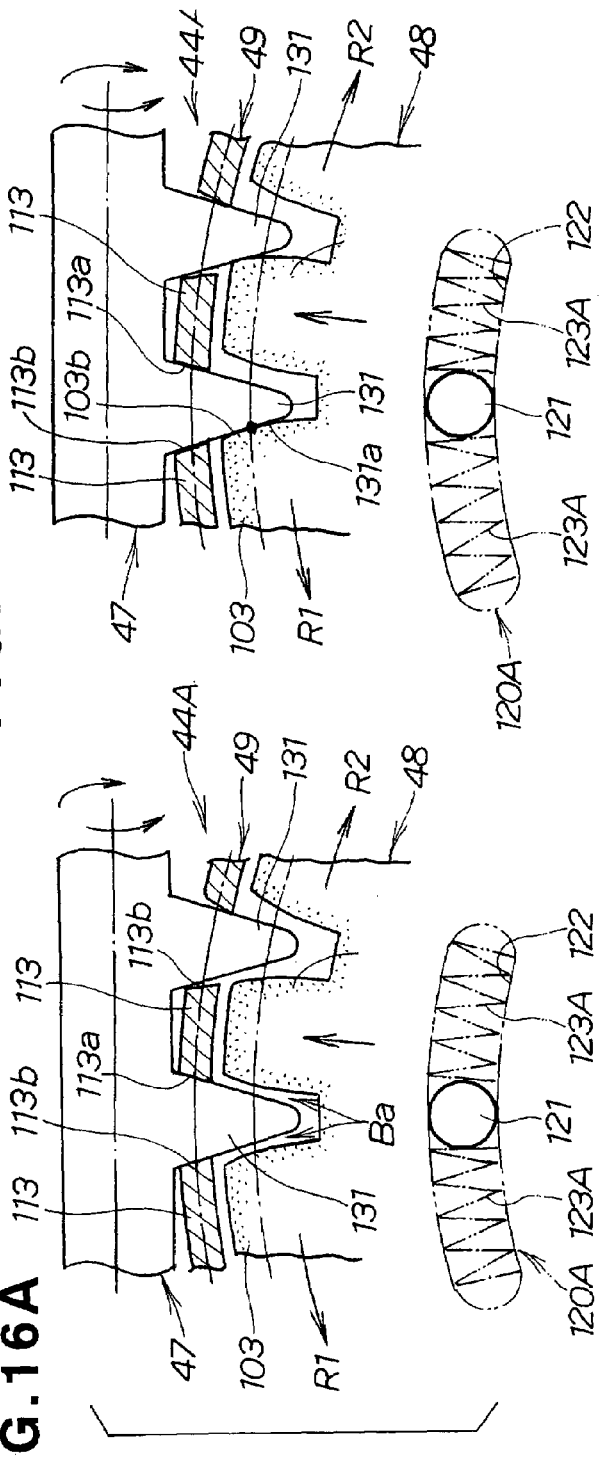
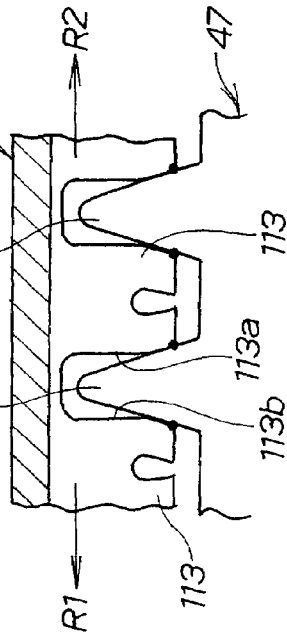
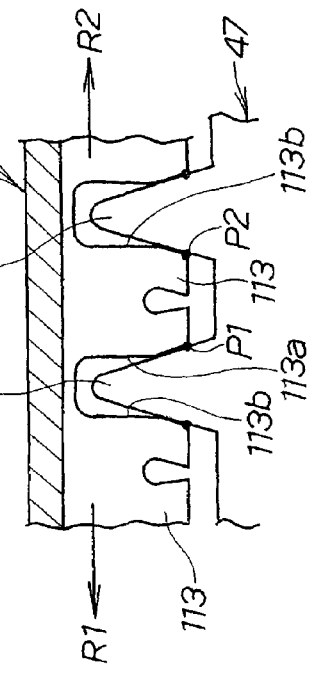
FIG.16A  FIG.16C  FIG.16B  FIG.16D

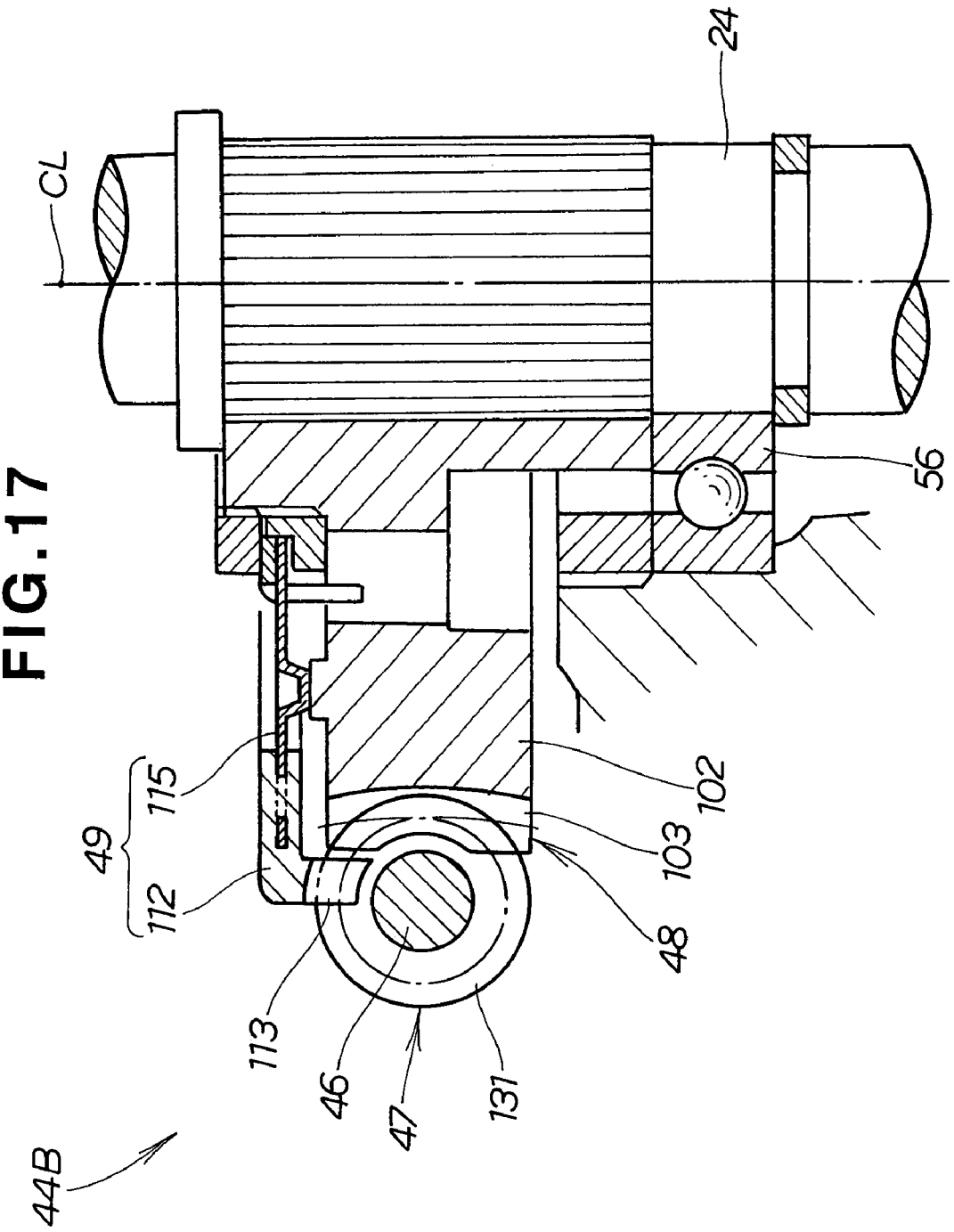

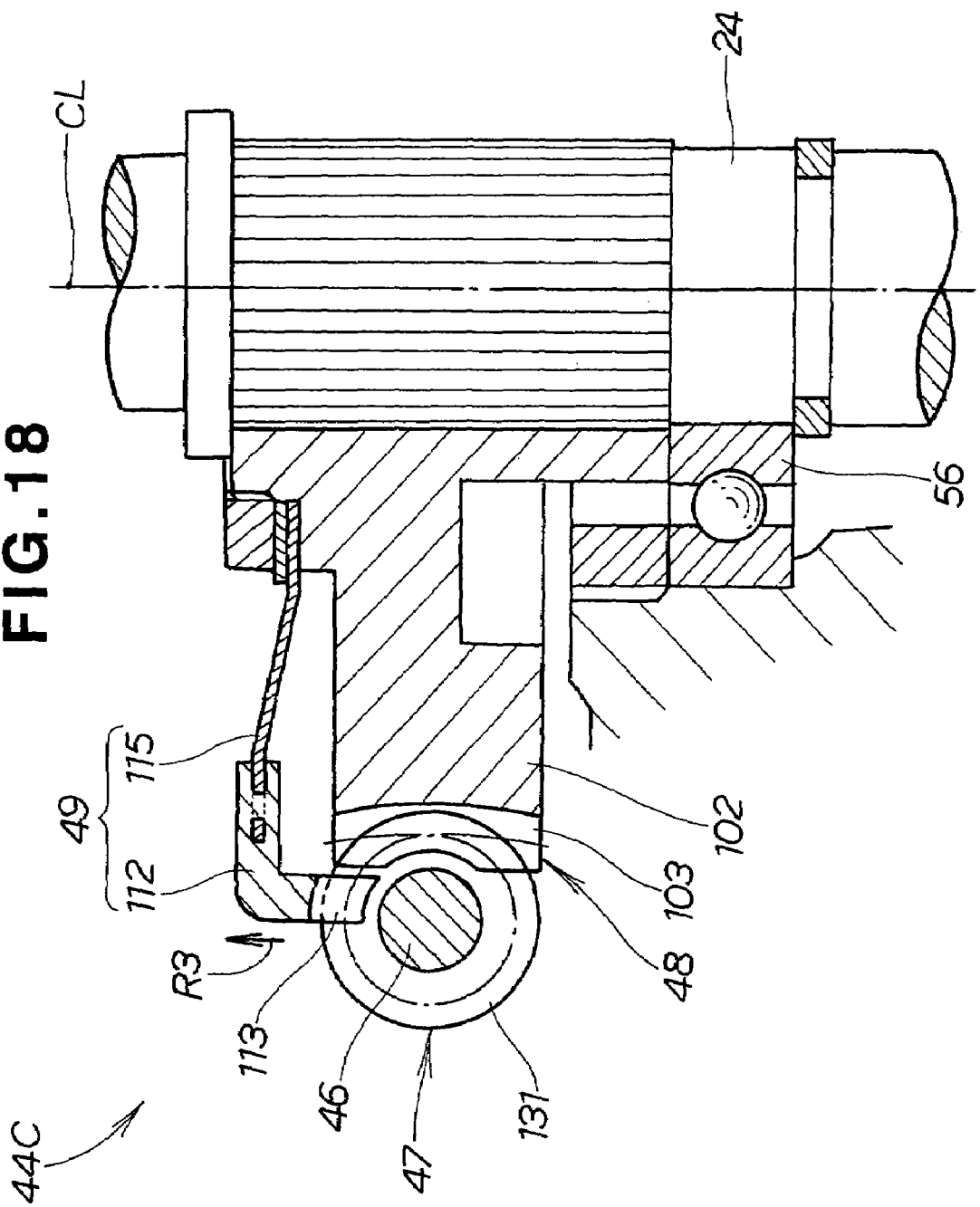

WORM GEAR MECHANISM AND ELECTRIC POWER STEERING APPARATUS EQUIPPED WITH THE WORM GEAR MECHANISM

FIELD OF THE INVENTION

The present invention relates to worm gear mechanisms and electric power steering apparatus equipped with such worm gear mechanisms.

BACKGROUND OF THE INVENTION

The worm gear mechanisms are transmission mechanisms which include a worm wheel meshing with a driving worm so that torque can be transmitted from the worm via the worm wheel to a load side (i.e., load-side component). In the field of such worm gear mechanisms, various techniques have been developed for reducing undesired backlash (see Japanese Patent Application Laid-open Publication Nos. 2001-355700 and 2002-37100). The worm gear mechanism disclosed in Japanese Patent Application Laid-open Publication No. 2001-355700 is outlined in FIGS. 19A to 19C, and the worm gear mechanism disclosed in Japanese Patent Application Laid-open Publication No. 2002-37100 is outlined in FIGS. 20A and 20B.

FIG. 19A shows the worm gear mechanism 200 connected to an electric motor 201, FIG. 19B is a sectional view of the worm gear mechanism 200, and FIG. 19C shows how a worm 202 and worm wheel 204 mesh with each other in the worm gear mechanism 200.

In the worm gear mechanism 200 of FIG. 19A, the driven worm wheel 204, connected to an output shaft 203, meshes with the driving worm 202 connected via a worm shaft 205 to the electric motor 201. As seen from FIGS. 19A to 19C, the worm wheel 204 includes a hub 206 fixedly mounted on the output shaft 203, and first and second gears 207 and 208 resiliently secured on the outer periphery of the hub 206 via a ring-shaped resilient member 209.

Namely, in the worm wheel 204 meshing with the worm 202, the two (first and second) gears 207 and 208 are separated from each other, via the resilient member 209, along an axial direction of the output rotation shaft 203 in phase-shifted relation to each other, and the resilient member 209 allows the two gears 207 and 208 to be slightly rotated relative to each other in a rotational direction of the worm wheel 204 and then resiliently rotated back to their original relative rotational positions after the rotation. In this worm gear mechanism 200, a tooth 202a of the worm 200 is held at its opposite surfaces by teeth 207a and 208a of the first and second gears 207 and 208, so as to minimize undesired backlash.

FIG. 20A shows the worm gear mechanism 300 disclosed in the 2002-37100 publication which is connected to an electric motor 301, and FIG. 20B is a sectional view of the worm gear mechanism 300.

In the worm gear mechanism 300 of FIG. 20A, a driven worm wheel 304, connected to an output shaft 303, meshes with a driving worm 302 connected via a motor shaft 305 to the electric motor 301. As seen in FIG. 20B, each tooth 311 of the worm wheel 304 has a meshing region 312 (shaded portion in the figure) that meshes with a tooth 302a of the worm 302. The worm wheel 304 has an annular holding groove portion 313 that is formed in one side of the tooth width, i.e. face width, (extending in a left-and-right direction of FIG. 20B) of each tooth 311 and located outwardly of the meshing region 312 of each tooth 311, and a rubber O-ring 321 is fitted in and secured to the annular groove portion 313. The rubber O-ring 321 is slightly deformed by contacting a top land (i.e., tooth top surface) 302b of the worm 302, and its resilient restoring force imparts a preload to meshing tooth regions to thereby reduce backlash.

However, in the conventional worm gear mechanism 200 shown in FIGS. 19A to 19C, where the worm wheel 204 comprises the two gears 207 and 208 separated from each other along the axial direction of the rotation shaft, the area of contact, with the tooth 202a of the worm 202, of each tooth of the worm wheel 204 is less than one-half the contact area in the traditional worm wheel having an integral (non-divided) gear. When the worm 202 is rotated in a forward direction, the torque is transmitted from the worm 202 to the teeth 207a of the first gear 207, while, when the worm 202 is rotated in a reverse direction, the torque is transmitted to the teeth 208a of the second gear 208. Particularly, the area where the first and second gears 207 and 208 are separated from each other (i.e., the middle portion of the width of the worm wheel in the illustrated example of FIG. 19B) is just where contact pressure, against the worm 202, of the worm wheel 304 becomes greatest. Therefore, further consideration or improvement has to be made for enhanced durability, wear resistance in particular, of the worm gear mechanism 200.

Further, in the conventional worm gear mechanism 300 of FIGS. 20A and 20B, where the annular holding groove portion 313 is formed in one side of the face width of each tooth 311 and located outwardly of the meshing region 312 of each tooth 311, bending rigidity in a tooth-thickness direction would differ between the opposite sides of each face width, which would make the contact pressure uneven between the opposite sides of the face width. Therefore, in this worm gear mechanism 300 too, further consideration or improvement has to be made for enhanced durability of the worm gear mechanism 300.

Besides, in the worm gear mechanism 300, considerable frictional force is produced by the rubber O-ring 321 held in rubbing contact with the top land 302b of the rotating worm 302. In addition, the worm wheel 304 has a relatively great radius from its rotation center (or rotation axis) to the rubbing contact surface of the rubber O-ring 321. Therefore, there would be produced a great friction torque. It is preferable that such a great friction torque be minimized in order to enhance a torque transmitting efficiency of the worm gear mechanism 300. Further, because the rubber O-ring 321 rubs the top land 302b with a great frequency, further consideration or improvement has to be made for enhanced durability of the O-ring 321.

If the worm gear mechanism 200 of FIGS. 19A to 19C or the worm gear mechanism 300 of FIGS. 20A and 20B is employed in an electric power steering apparatus, it is also required to minimize impinging or hitting sound that would be produced between the teeth as the steering wheel is operated by a vehicle driver, so as to minimize noise sound in a vehicle compartment.

Furthermore, because, as well known, the electric power steering apparatus is constructed to add steering assist torque of an electric motor to a steering system via the worm gear mechanism 200 or 300, it is highly preferable to eliminate the backlash in order to achieve an enhanced steering feel; this is due to the fact that, when the steering wheel is turned back by the driver after being turned in a given direction, presence of the backlash would undesirably delay the steering assist torque transmission from the worm gear mechanism 200 or 300 to the steering system.

For the foregoing reasons, there has been a demand for a technique which can reduce hitting sound between the teeth of the worm and worm wheel, which can enhance durability of the worm gear mechanism and which can maintain appropriate meshing between the worm and the worm wheel.

SUMMARY OF THE INVENTION

According to an aspect of the present invention, there is provided an improved worm gear mechanism, which comprises: a driving worm; a torque-transmitting worm wheel meshing with the worm for transmitting torque from the worm to a load side; an auxiliary worm wheel meshing with the worm and having a pitch diameter greater than a pitch diameter of the torque-transmitting worm wheel; and a resilient member for resiliently urging the auxiliary worm wheel relative to the torque-transmitting worm wheel. At positions where the torque-transmitting worm wheel and the auxiliary worm wheel mesh with the worm, a tooth of the worm is held at opposite surfaces thereof between teeth of the torque-transmitting worm wheel and the auxiliary worm wheel. Also, the resilient member resiliently urges the auxiliary worm wheel in such a direction as to keep the tooth of the worm held between the teeth.

Because the pitch diameter of the auxiliary worm wheel is set to be greater than that of the torque-transmitting worm wheel, the auxiliary worm wheel can mesh with the worm with a different meshing phase from the torque-transmitting worm wheel. Thus, the torque-transmitting worm wheel can have a sufficient tooth width, i.e. face width, and hence a sufficient area of contact with the tooth of the worm, which can significantly enhance the durability of the worm gear mechanism with backlash eliminated therefrom.

The elimination of backlash can also effectively reduce hitting sound between the teeth of the worm and the torque-transmitting worm wheel.

Further, the face width of the torque-transmitting worm wheel can be set to be symmetrical about the meshing region where the worm wheel meshes with the worm, as the worm is viewed in its axial direction. In addition, the torque-transmitting worm wheel can be formed integrally, without a particular groove having to be formed therein for holding a backlash reducing component as employed in the conventionally-known technique. Therefore, the present invention can enhance a processing accuracy of the teeth of the torque-transmitting worm wheel, thereby maintaining appropriate meshing engagement of the torque-transmitting worm wheel with the driving worm.

Preferably, in the present invention, the auxiliary worm wheel is rotatable relative to the torque-transmitting worm wheel about the same rotation center or axis as the torque-transmitting worm wheel.

Further, it is preferable that a pitch diameter of the worm defined when the auxiliary worm wheel is meshing with the worm be smaller than a pitch diameter of the worm defined when the torque-transmitting worm wheel is meshing with the worm. Because the driving worm has such pitch diameters corresponding to the auxiliary and torque-transmitting worm wheels whereas the tooth pitch of the worm is constant, the lead angle of the teeth can be increased, and the thus-increased lead angle can reduce frictional loss between the worm and the auxiliary worm wheel. The thus-reduced frictional loss allows the auxiliary worm wheel to be rotated smoothly with smaller force. As a result, the worm gear mechanism of the invention can operate with increased smoothness, so that the durability of the worm gear mechanism can be enhanced even further.

According to another aspect of the present invention, there is provided an improved worm gear mechanism, which comprises: a driving worm; a torque-transmitting worm wheel meshing with the worm for transmitting torque from the worm to a load side; an auxiliary worm wheel meshing with the worm with no backlash and having a pitch diameter greater than a pitch diameter of the torque-transmitting worm wheel; and a resilient member for, when the auxiliary worm wheel has rotated relative to the torque-transmitting worm wheel, resiliently urging the auxiliary worm wheel in a direction back toward an original rotational position of the auxiliary worm wheel.

Namely, according to this aspect of the present invention, the auxiliary worm wheel is meshing with the worm with no backlash (i.e., gap), and, when the auxiliary worm wheel has rotated relative to the torque-transmitting worm wheel, the resilient member serves to resiliently urge the auxiliary worm wheel back toward the original rotational position of the auxiliary worm wheel. Thus, with the teeth of the auxiliary worm wheel meshing with the tooth of the worm with no backlash (gap), the auxiliary worm wheel can be normally resiliently urged back toward the original neutral position relative to the torque-transmitting worm wheel. Therefore, the worm can first start rotating the auxiliary worm wheel against the resilient urging force of the resilient member and then start rotating the torque-transmitting worm wheel while rotating the auxiliary worm wheel. As a consequence, the tooth of the worm can be brought into gentle contact with the teeth of the torque-transmitting worm wheel, which thereby achieves even further enhanced durability of the worm gear mechanism.

According to still another aspect of the present invention, there is provided an improved electric power steering apparatus for use in a vehicle, which comprises: a worm gear mechanism; a steering system extending from a steering wheel to a steerable road wheel of the vehicle; and an electric motor for generating steering assist torque to assist steerage of the steerable road wheel in response to steering operation, by a vehicle driver, of the steering wheel or all necessary torque for steerage of the steerable road wheel, and supplying the steering assist torque or all necessary torque to the steering system via the worm gear mechanism. In the electric power steering apparatus of the invention, the worm gear mechanism comprises: a driving worm; a torque-transmitting worm wheel meshing with the worm for transmitting torque from the worm to a load side; an auxiliary worm wheel meshing with the worm and having a pitch diameter greater than a pitch diameter of the torque-transmitting worm wheel; and a resilient member for resiliently urging the auxiliary worm wheel relative to the torque-transmitting worm wheel. At positions where the torque-transmitting worm wheel and the auxiliary worm wheel mesh with the worm, a tooth of the worm is held at opposite surfaces thereof between teeth of the torque-transmitting worm wheel and the auxiliary worm wheel, and the resilient member resiliently urges the auxiliary worm wheel in such a direction as to keep the tooth of the worm held between the teeth.

In the electric power steering apparatus, where the worm gear mechanism arranged in the above-identified manner is employed as a transmission mechanism for transmitting the torque, generated by the motor, to the steering system, it is possible to enhance the durability of the backlash-eliminated worm gear mechanism.

The worm gear mechanism in the electric power steering apparatus of the invention can eliminate undesired backlash on the basis of the principles explained above in relation to the first-identified aspect of the invention and can thereby minimize hitting sound produced between the worm and worm wheel teeth due to steering operation of the steering wheel, thus minimizing noise sound in the vehicle compartment.

Further, the elimination of backlash in the worm gear mechanism can maintain appropriate meshing engagement of the torque-transmitting worm wheel with the worm. Thus, the inventive arrangements can prevent a time delay when the steering assist torque is transmitted via the worm gear mechanism to the steering system in response to turning-back operation, by the vehicle driver, of the steering wheel. Further, because the elimination of backlash permits gentle contact between the teeth of the worm and worm wheel when the torque-transmitting worm wheel is rotated via the worm, the steering wheel can be turned back smoothly and appropriately.

In this way, the present invention can achieve an even further improved steering feel of the electric power steering apparatus.

According to yet another aspect of the present invention, there is provided an electric power steering apparatus for use in a vehicle, which comprises: a worm gear mechanism; a steering system extending from a steering wheel to a steerable road wheel of the vehicle; and an electric motor for generating steering assist torque to assist steerage of the steerable road wheel in response to steering operation of the steering wheel or all necessary torque for steerage of the steerable road wheel, and supplying the steering assist torque or all necessary torque to the steering system via the worm gear mechanism, and in which the worm gear mechanism comprises: a driving worm; a torque-transmitting worm wheel meshing with the worm for transmitting torque from the worm to a load side; an auxiliary worm wheel meshing with the worm with no backlash and having a pitch diameter greater than a pitch diameter of the torque-transmitting worm wheel; and a resilient member for, when the auxiliary worm wheel has rotated relative to the torque-transmitting worm wheel, resiliently urging the auxiliary worm wheel in a direction back toward an original rotational position of the auxiliary worm wheel.

With the auxiliary worm wheel meshing with the worm with no backlash as noted above, the worm tooth can gently contact the teeth of the torque-transmitting worm wheel, so that the steering wheel can be operated smoothly without hitting sound being produced between the teeth.

BRIEF DESCRIPTION OF THE DRAWINGS

Certain preferred embodiments of the present invention will hereinafter be described in detail, by way of example only, with reference to the accompanying drawings, in which:

FIGS. 6A to 6C are views showing an example of a neutral position maintaining mechanism of FIG. 5, and FIG. 6D is a view showing a modified example of an arcuate elongated hole portion in the neutral position maintaining mechanism;

FIG. 13 is a view showing how an auxiliary worm wheel meshes with the worm in the second embodiment of the worm gear mechanism;

FIGS. 16A to 16D are views explanatory of behavior of the second embodiment of the worm gear mechanism;

FIG. 17 is a sectional view corresponding to FIG. 3 and showing a left half portion of a worm gear mechanism in accordance with a third embodiment of the present invention;

FIG. 18 is a sectional view corresponding to FIG. 3 and showing a left half portion of a worm gear mechanism in accordance with a fourth embodiment of the present invention;

DETAILED DESCRIPTION OF THE PREFERRED EMBODIMENTS

Now, description will be given about an electric power steering apparatus equipped with a worm gear mechanism of the present invention.

FIGS. 1 to 9 show the electric power steering apparatus and a first embodiment of the worm gear mechanism employed in the electric power steering apparatus.

Figure 1:
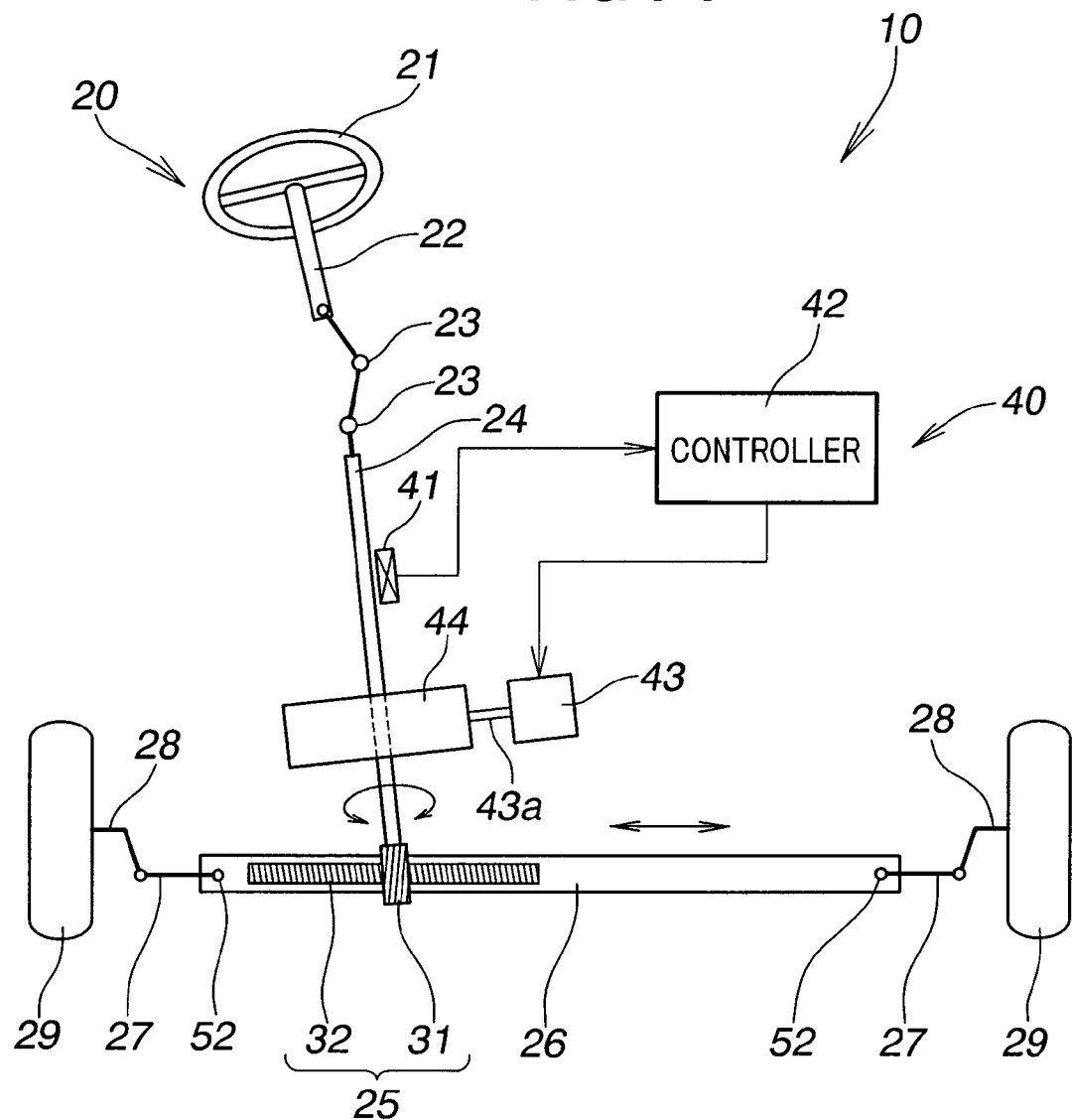
FIG. 1 is a schematic view of an electric power steering apparatus equipped with a worm gear mechanism in accordance with a first embodiment of the present invention.

The electric power steering apparatus 10 shown in FIG. 1 generally comprises a steering system 20 extending from a vehicle steering wheel 21 to steerable road wheels (in the illustrated example, left and right front road wheels) 29 of the vehicle, and a steering assist torque mechanism 40 for supplying steering assist torque to the steering system 20.

In the steering system 20, a pinion shaft (input shaft) 24 is coupled to the steering wheel 21 via a steering shaft 22 and universal joints 23, and a rack shaft 26 is coupled to the pinion shaft 24 via a rack-and-pinion mechanism 25. Further, the left and right steerable road wheels 29 are coupled to opposite ends of the rack shaft 26 via left and right tie rods 27 and knuckle arms 28. The rack-and-pinion mechanism 25 includes a pinion 31 formed on the pinion shaft 24 and a rack 32 formed on the rack shaft 26.

By a human operator or driver of the vehicle operating the steering wheel 21, steering torque is delivered from the steering wheel 21 to the left and right steerable road wheels 29 via the rack-and-pinion mechanism 25, left and right tie rods 27 etc. and thereby steers the road wheels 29.

The steering assist torque mechanism 40 includes a steering torque sensor 41 for detecting steering torque applied by the driver to the steering system 20 through operation of the steering wheel 21, a control unit 42 for generating a control signal on the basis of the detected steering torque, an electric motor 43 for generating steering assist torque corresponding to the driver-applied steering torque on the basis of the control signal, and the worm gear mechanism 44 for transmitting the motor-generated steering assist torque from the motor 43 to the pinion shaft 24. The steering assist torque transmitted to the pinion shaft 24 is further transmitted to the rack-and-pinion mechanism 25.

The left and right steerable road wheels 29 are steered by a combination of (i.e., composite torque composed of) the driver-applied steering torque and motor-generated steering assist torque via the rack shaft 26.

Figure 2:
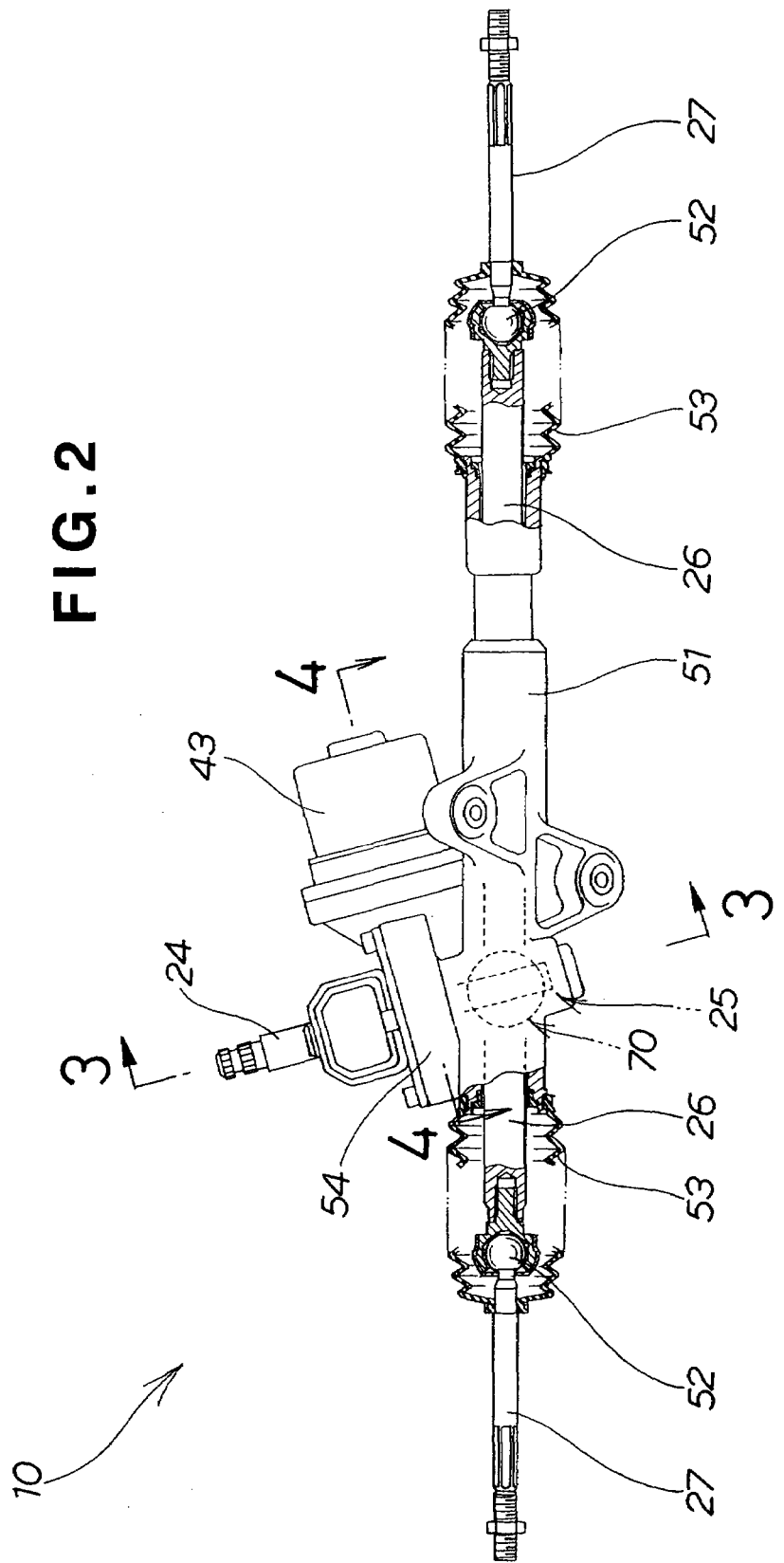
FIG. 2 is a view showing details of a pinion shaft and rack shaft shown in FIG. 1.

FIG. 2 shows details of the pinion shaft 24 and rack shaft 26. The rack shaft 26 is accommodated in a housing 51 extending in a widthwise direction of the vehicle (left-and-right direction in FIG. 2), and the rack shaft 26 is sidable axially within the housing 51. The tie rods 27 are coupled, via ball joints, to the opposite ends of the rack shaft 26 projecting outwardly from the housing 51. Reference numeral 53 represents a dust seal boot.

Figure 3:
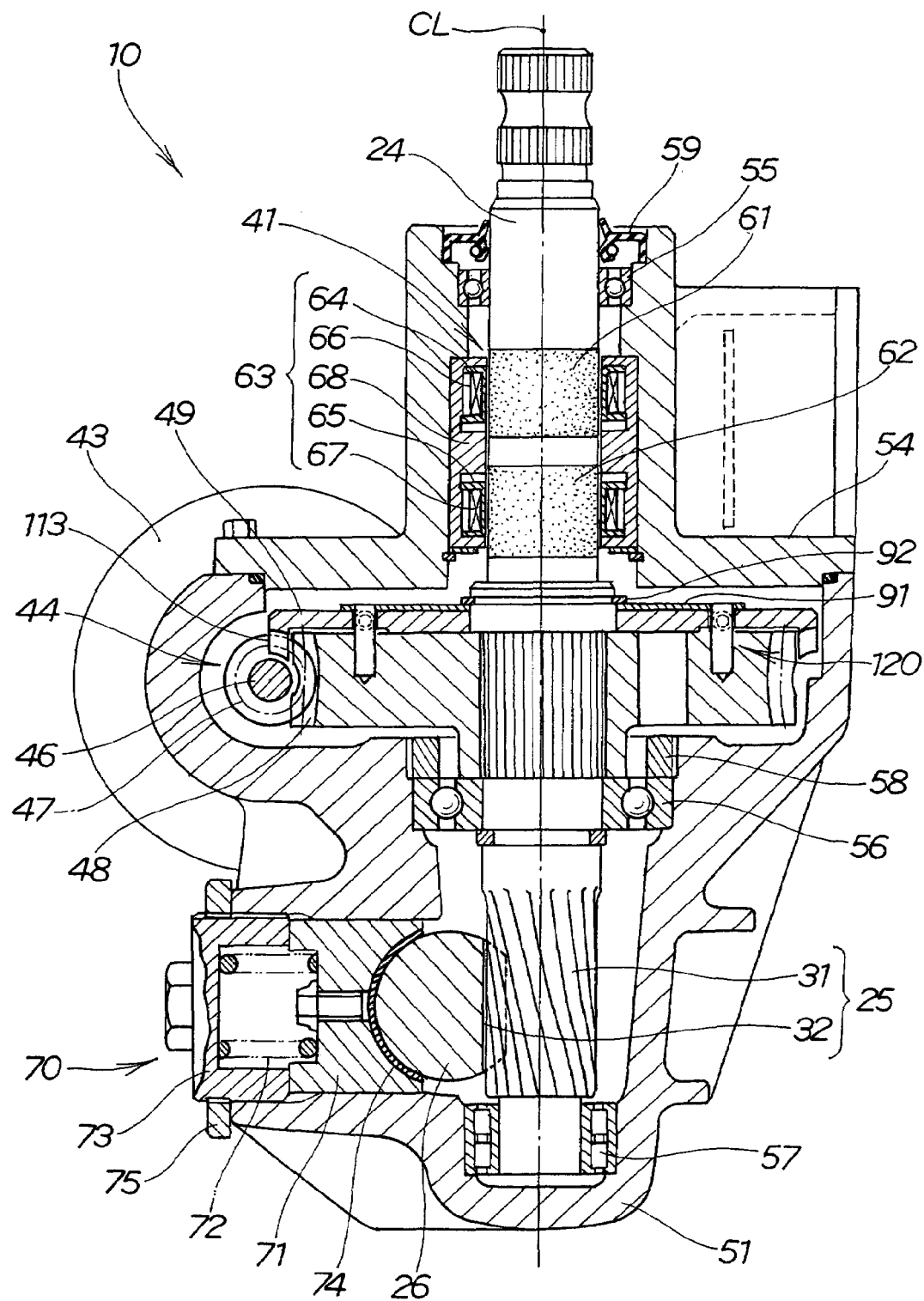
FIG. 3 is an enlarged sectional view taken along the 3-3 line of FIG. 2.

FIG. 3 is an enlarged sectional view taken along the 3-3 line of FIG. 2. The pinion shaft 24, rack-and-pinion mechanism 25, steering torque sensor 41 and worm gear mechanism 44 are together accommodated in the housing 51. The housing 51 has an upper opening normally closed with an upper cover 54. The steering torque sensor 41 is attached to the upper cover 54.

The worm gear mechanism 44 includes a torque-transmitting worm wheel 48 meshing with a driving worm 47 so as to transmit torque from the worm 47 to a load side. The worm gear mechanism 44 also includes an auxiliary worm wheel 49 rotatable relative to the torque-transmitting worm wheel 48 about the same rotation center or axis CL as the worm wheel 48. The pinion shaft 24 is also rotatable about the rotation axis CL. The auxiliary worm wheel 49 also meshes with the worm 47. The auxiliary worm wheel 49 is provided with a view to eliminating undesired backlash between the worm 47 and the torque-transmitting worm wheel 48.

The vertically-extending pinion shaft 24 is rotatably supported, at its upper end portion, longitudinally-middle portion and lower end portion, by the housing 51 by means of three bearings 55, 56 and 57. The electric motor 43 and rack guide 70 are secured to the housing 51. Reference numeral 58 represents a lock nut, and 59 an oil seal.

The steering torque sensor 41 is mounted on the pinion shaft 24, and it is in the form of a magnetostrictive torque sensor, which comprises first and second residual magnetostriction sections 61 and 62 that vary in magnetostrictive characteristic in response to torque produced through operation of the pinion shaft 24, and a detection section 63 that is disposed around the first and second residual magnetostriction sections 61 and 62 for electrically detecting a magnetostrictive effect produced in the residual magnetostriction sections 61 and 62. The magnetostrictive effect detected by the detection section 63 is output as a torque signal.

The first and second residual magnetostriction sections 61 and 62 are in the form of magnetostrictive films imparted with residual magnetostrictions in opposite directions along the axis of the pinion shaft 24.

The detection section 63 includes cylindrical coil bobbins 64 and 65 through which the pinion shaft 24 is passed, first and second multi-layer solenoid coils 66 and 67 wound on the corresponding coil bobbins 64 and 65, and a magnetic-shielding yoke surrounding the first and second multi-layer solenoid coils 66 and 67.

The rack guide 70 is a pressing means which includes a guide section 71 for guiding and supporting the rack shaft 26 along one side of the shaft 26 opposite from the rack 32, and an adjusting bolt 73 for pressing the guide section 71 by means of a compression spring 72.

Between the guide section 71 and the adjusting bolt 73, a slight gap is formed in a direction of adjustment of the adjusting bolt 73. The guide section 71 includes a support member 74 along which the back surface of the rack shaft 26 is caused to slide. Reference numeral 75 represents a lock nut. Namely, the rack guide 70 supports the rack shaft 26 for axial sliding movement therealong. Further, the rack 32 is pressed against the pinion 31 with a preload imparted to the rack 32 by the guide section 71 being pressed with appropriate force via the compression spring 72.

Figure 4:
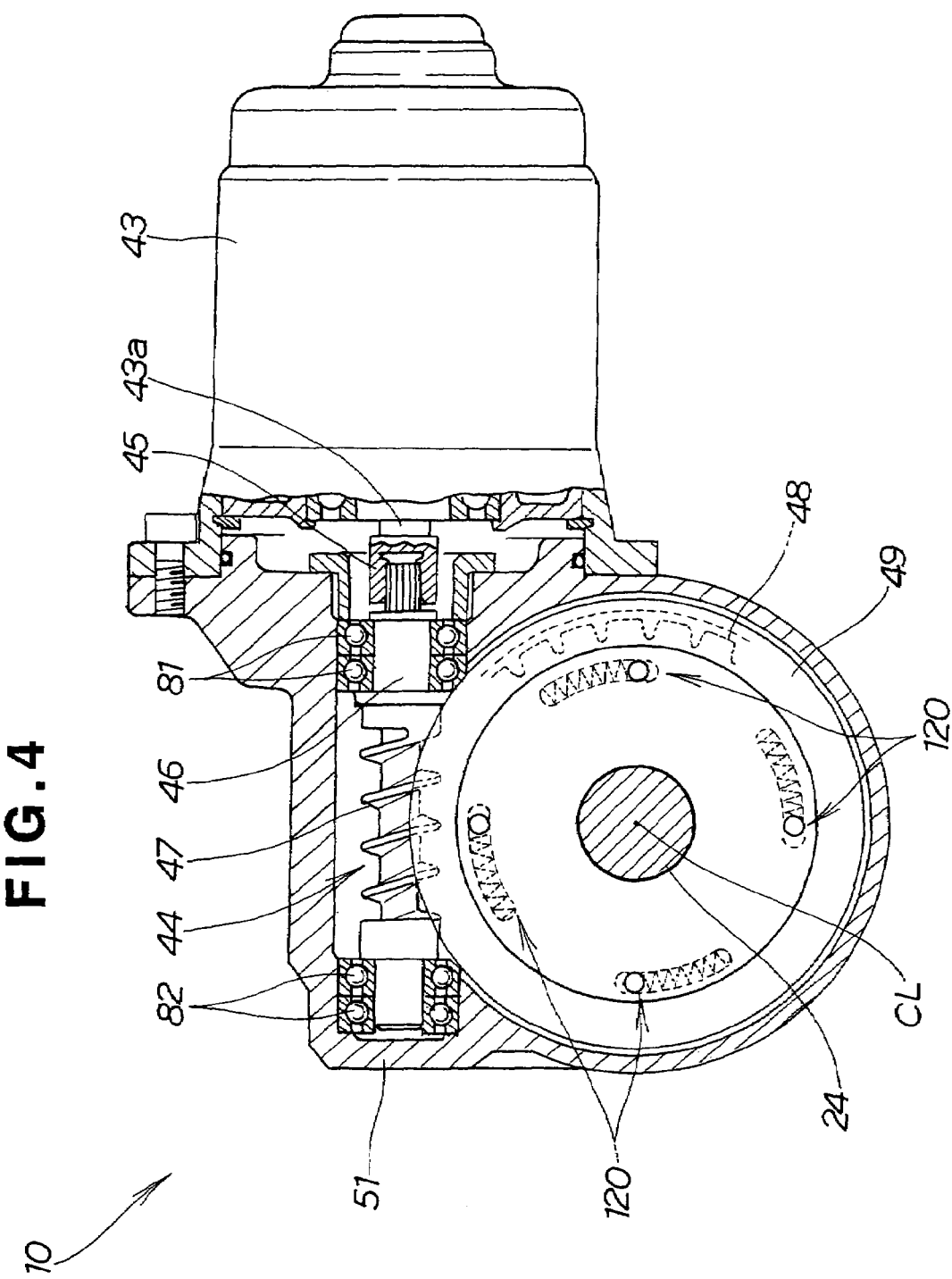
FIG. 4 is a sectional view taken along the 4-4 line of FIG. 2 showing relationship among the pinion shaft, electric motor and worm gear mechanism.

FIG. 4 is a partly-sectional view showing relationship among the pinion shaft 24, motor 43 and worm gear mechanism 44. The motor 43 is attached to the housing 51 with its rotation shaft 43a oriented horizontally and extending into the housing 51. The worm gear mechanism 44 is an assist torque transmission mechanism, or torque assistor mechanism, for transmitting steering assist torque, generated by the motor 43, to the pinion shaft 24.

More specifically, the worm gear mechanism 44 includes a worm shaft 46 coupled via a coupling 45 to the rotation shaft 43a of the motor 43, the worm 47 integrally formed on the worm shaft 46, and the torque-transmitting worm wheel 48 coupled to the pinion shaft 24. The horizontally-extending worm shaft 46 is rotatably supported at its opposite ends within the housing 51 via bearings 81 and 82.

Figure 5:
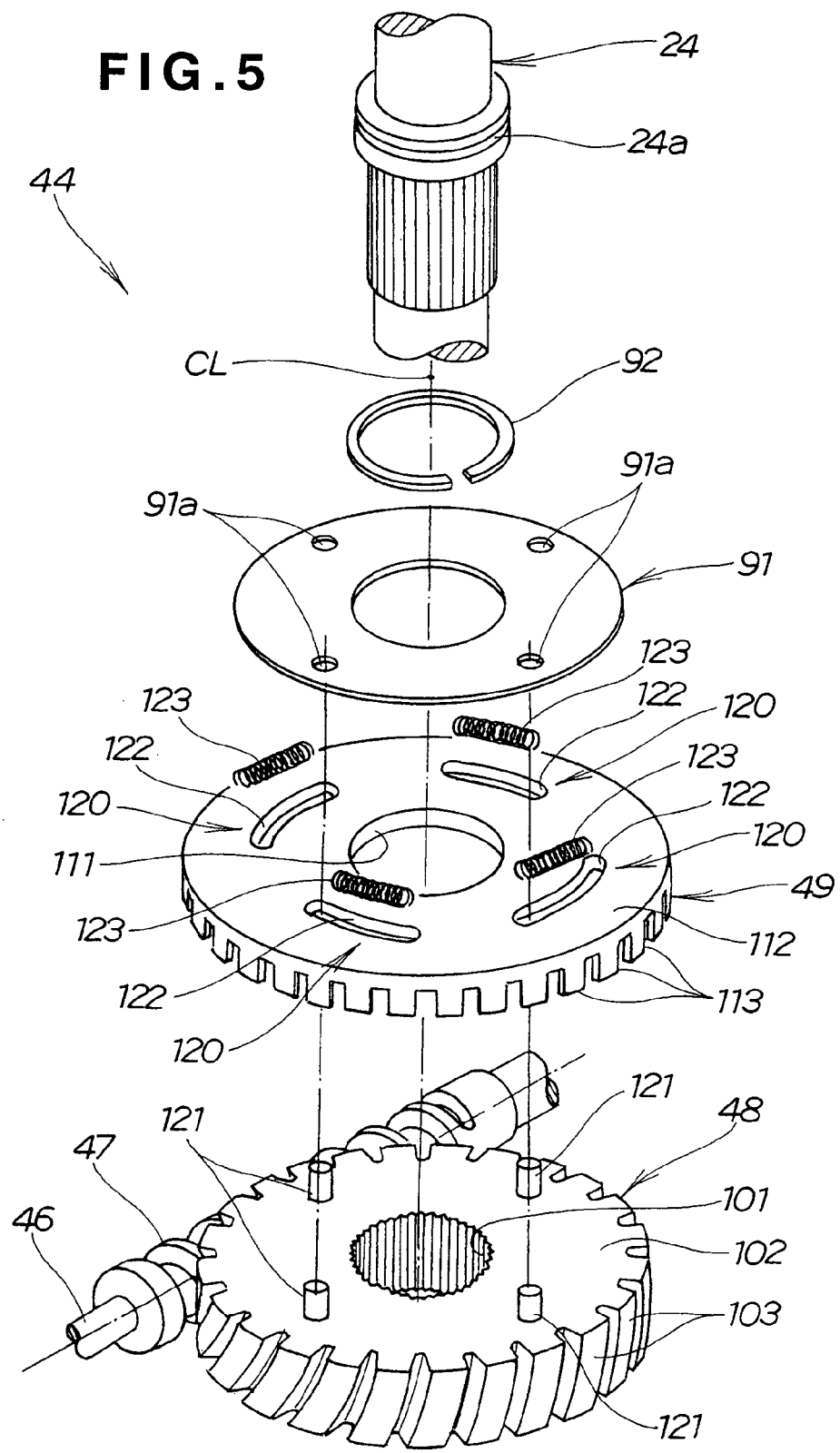
FIG. 5 is an exploded view of the first embodiment of the worm gear mechanism.

Now, the first embodiment of the worm gear mechanism 44 will be detailed with reference to FIG. 3 and an exploded view of FIG. 5.

The torque-transmitting worm wheel 48 is coupled to the pinion shaft 24 in such a manner that its movement along the longitudinal axis of the pinion shaft 24 is prevented. The auxiliary worm wheel 49 is rotatably mounted on the pinion shaft 24 to lie over the torque-transmitting worm wheel 48, and a retaining plate 91 is laid over the auxiliary worm wheel 49. Stopper ring 92 is engaged in a retaining groove 24a of the pinion shaft 24 above the retaining plate 91, so that the auxiliary worm wheel 49 and retaining plate 91 are positioned between the torque-transmitting worm wheel 48 and the stopper ring 92 against movement along the axis of the pinion shaft 24.

The torque-transmitting worm wheel 48 includes a disk-shaped wheel body 102 having a central fitting hole portion 101, and the wheel body 102 is in the form of a gear having a plurality of teeth 113 integrally formed on its outer peripheral surface. The fitting hole portion 101 has a serrated groove meshing with the pinion shaft 24.

The auxiliary worm wheel 49 includes a disk-shaped wheel body 112 having a central fitting hole portion 111, and the wheel body 112 is in the form of a cap-shaped gear having a plurality of teeth 113 formed on its outer peripheral surface and projecting toward the torque-transmitting worm wheel 48.

The worm gear mechanism 44 also includes a plurality of (e.g., four) neutral position maintaining mechanisms 120 for holding the auxiliary worm wheel 49 at a neutral phase position (neutral angular or rotational position) relative to the torque-transmitting worm wheel 48.

The following paragraphs describe the neutral position maintaining mechanisms 120 with reference to FIGS. 5 and 6A to 6D.

The neutral position maintaining mechanisms 120 are all of the same construction and disposed at uniform angular intervals about the rotation center (or rotation axis) CL of the auxiliary worm wheel 49. Each of the neutral position maintaining mechanisms 120 comprises an upright pin 121 of a circular cross section projecting from the upper surface of the torque-transmitting worm wheel 48, an arcuate elongated hole portion 122 formed through the thickness of the auxiliary worm wheel 49 and extending along the circumference of the wheel 49 in such a manner that the pin 121 is fitted in the hole portion 122 for sliding movement along the longitudinal inner edges of the hole portion 122, and a compression spring (resilient member) 123 disposed between one end 122a of the hole portion 122 and the pin 121; in the illustrated example, the one end 122a is shaped semi-circularly. The elongated hole portion 122 is concentric with the rotation center CL (FIG. 5) of the auxiliary worm wheel 49 and has a size to allow the compression spring 123 to be fitted therein. The compression spring 123 resiliently urges the auxiliary worm wheel 49 relative to the torque-transmitting worm wheel 48 in a rotational direction thereof.

The retaining plate 91 is laid on the upper surface of the auxiliary worm wheel 49 to prevent the compression spring 123 of each of the neutral position maintaining mechanisms 120 from dropping out of the corresponding hole portion 122, and it has a plurality of through-holes 91a to allow the respective distal end portions of the pins 121 to pass thereinto or pass therethrough.

FIG. 6D shows a modification of the arcuate elongated hole portion 122 where the one end 122a is formed flat.

Figure 7:
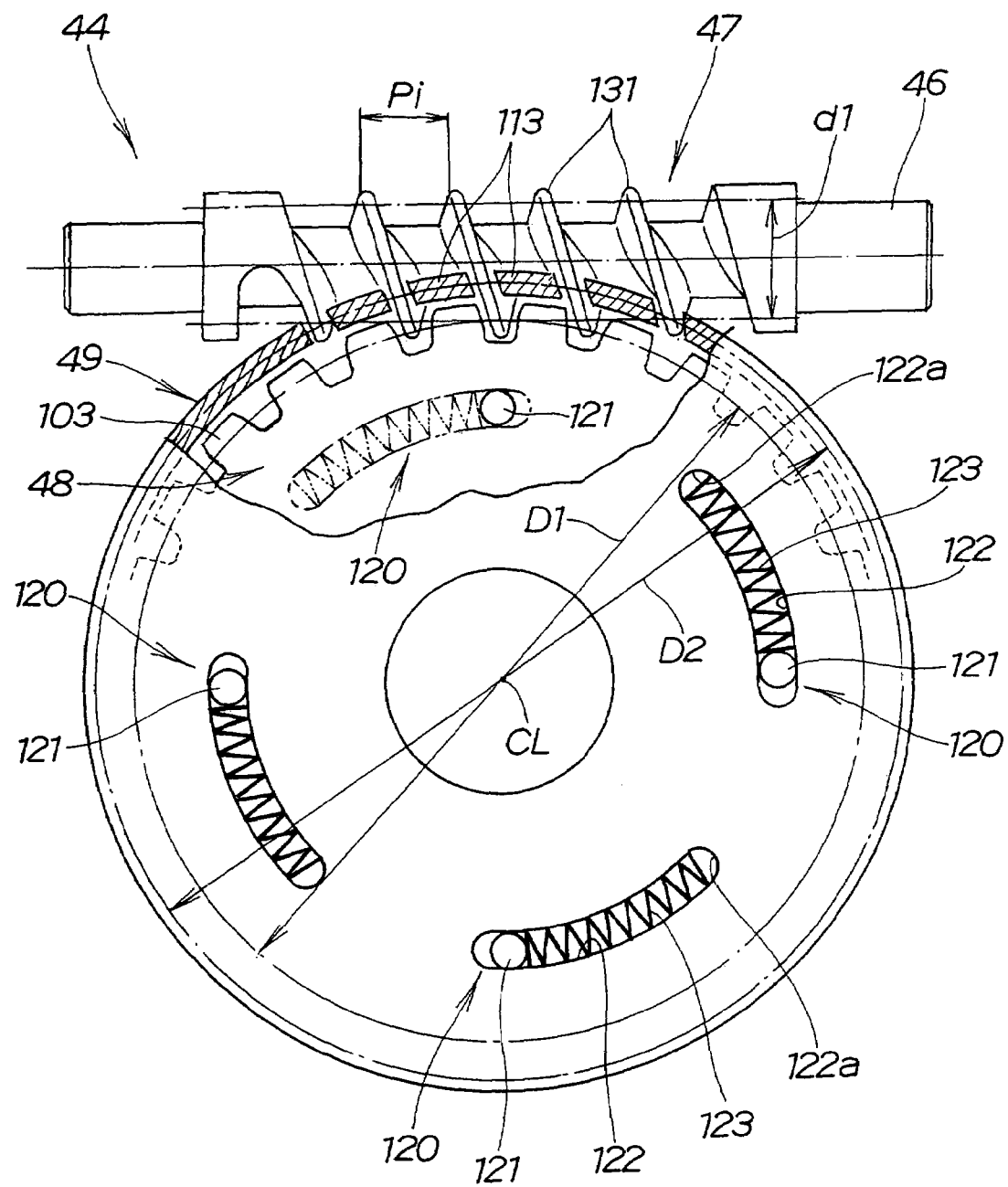
FIG. 7 is a plan view of the first embodiment of the worm gear mechanism, which particularly shows in section a part of an auxiliary worm wheel.

FIG. 7 is a plan view of the first embodiment of the worm gear mechanism 44, which particularly shows in section a part of the auxiliary worm wheel 49.

The auxiliary worm wheel 49 has a pitch diameter D2 greater than a pitch diameter D1 of the torque-transmitting worm wheel 48 (i.e., D1<D2). The auxiliary worm wheel 49 meshes with the worm 47.

The worm 47 is formed of metal, such as carbon steel for machine structural use (JIS-G-4051) or other kind of steel. The torque-transmitting worm wheel 48 and auxiliary worm wheel 49 are formed of resin, such as nylon resin. Because the resin-made torque-transmitting worm wheel 48 and auxiliary worm wheel 49 mesh with the metal-made worm 47, relatively smooth meshing engagement is achieved, which can reduce meshing noise sound.

Each tooth 131 of the worm 47 has a substantial trapezoidal sectional shape as viewed in a direction perpendicular to the axis of the worm 47. Each tooth 103 of the torque-transmitting worm wheel 48 has an involute sectional shape as viewed in a direction perpendicular to the axis of the wheel 48. The teeth of the worm 47 are formed by a single thread having a pitch Pi.

Figure 8:
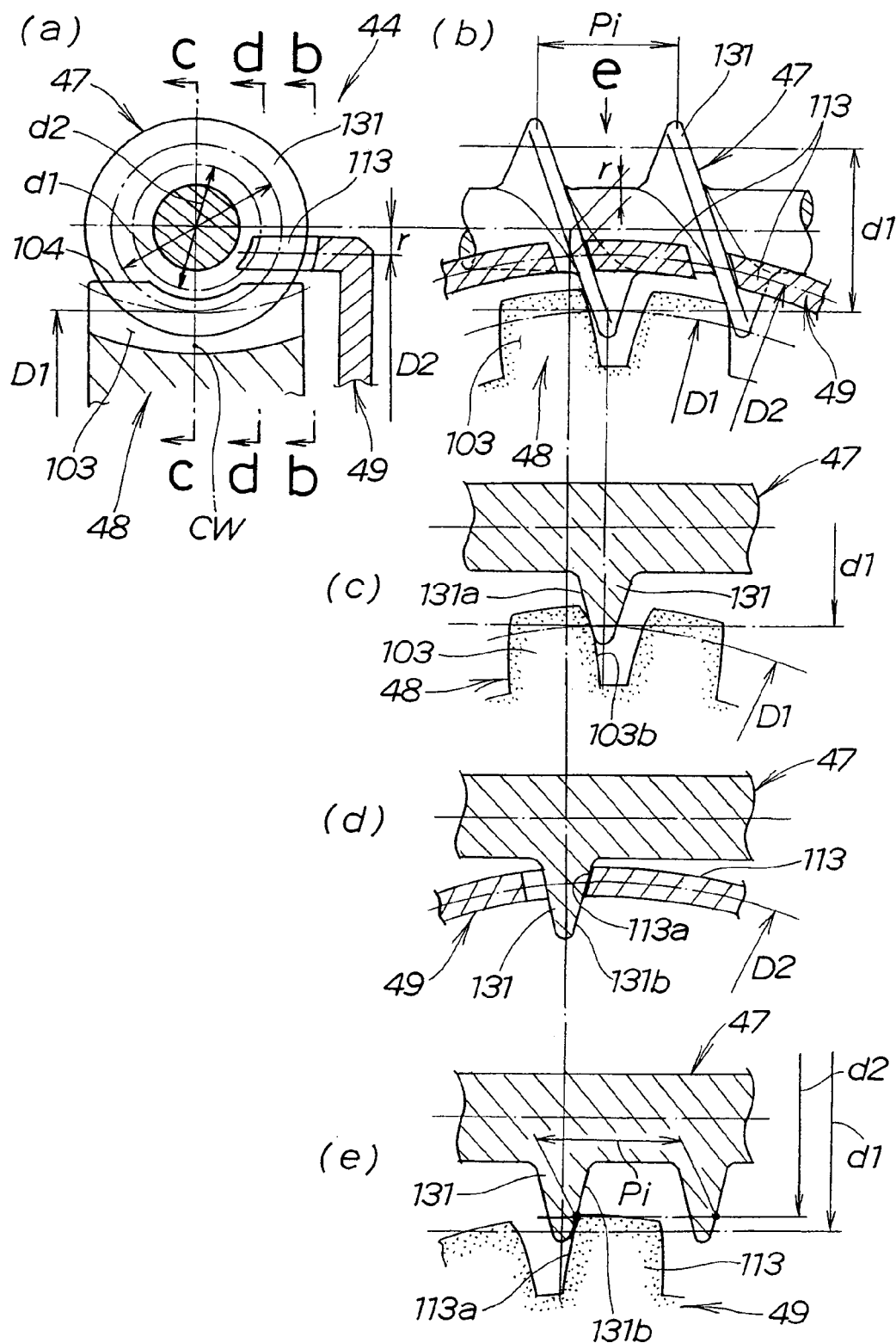
FIG. 8 is a view showing relationship among respective teeth of a worm, torque-transmitting worm wheel and auxiliary worm wheel in the first embodiment of the worm gear mechanism.

FIG. 8 shows the construction of the first embodiment of the worm gear mechanism 44. Part (a) of FIG. 8 illustrates a sectional construction of the worm gear mechanism 44 in corresponding relation to FIG. 3, and part (b) of FIG. 8 is a sectional view taken along the b-b line of part (a).

As illustrated in (a) and (b), the cap-shaped auxiliary worm wheel 49 is laid on the torque-transmitting worm wheel 48 in such a manner that the teeth 113 surround an outer peripheral end surface 104 of the worm wheel 48 with a given clearance therebetween and thereby meshes with the worm 47. Thus, the teeth 113 of the auxiliary worm wheel 49 are prevented from interfering with the worm wheel 48.

Because, as noted above, the pitch diameter D2 of the auxiliary worm wheel 49 is greater than the pitch diameter D1 of the worm wheel 48, the auxiliary worm wheel 49 meshes with the worm 47 at a different meshing phase from the torque-transmitting worm wheel 48. As a consequence, the torque-transmitting worm wheel 48 can be set to have a sufficient face width that is, for example, generally equal to the outer diameter of the worm 47. Therefore, the teeth 103 of the torque-transmitting worm wheel 48 can have a sufficient area of contact with the teeth 131 of the worm 47, which enhances the durability of the worm gear mechanism 44.

Distance from the center of the worm 47 to the pitch circle of the auxiliary worm wheel 49 is represented here by "r", and this distance r can be calculated by Equation (1) below.

$$r=(D1+d1-D2)/2 \quad (1)$$

where d1 represents a pitch diameter of the worm 47 defined when the torque-transmitting worm wheel 48 is meshing with the worm 47.

The distance r may be set to any desired value; it may be even zero. Namely, the pitch diameter D2 of the auxiliary worm wheel 49 only has to be equal to or greater than "D1+d1". Specifically, it is only necessary to set the pitch diameter D2 such that the teeth 113 of the auxiliary worm wheel 49 do not interfere with the torque-transmitting worm wheel 48 and the worm wheel 49 can appropriately mesh with the worm 47.

Further, the worm gear mechanism 44 is characterized in that the auxiliary worm wheel 49 is shaped like a cap such that its teeth 113 surrounds the outer peripheral edge surface 104 of the torque-transmitting worm wheel 48. Thus, despite the addition of the auxiliary worm wheel 49 to the torque-transmitting worm wheel 48, the former will not interfere with the latter. Therefore, the torque-transmitting worm wheel 48 can be set to an event more sufficient face width. As a consequence, the teeth 103 of the torque-transmitting worm wheel 48 can have an even more sufficient area of contact with the tooth 131 of the worm 47, which can even further enhance the durability of the worm gear mechanism 44.

The worm gear mechanism 44 is further characterized in that a pitch diameter d2 of the worm 47 defined when the auxiliary worm wheel 49 is meshing with the worm 47 is smaller than the pitch diameter d1 of the worm 47 defined when the torque-transmitting worm wheel 48 is meshing with the worm 47 (i.e., d1>d2). Because the pitch diameter d2 is smaller than the pitch diameter d1 whereas the tooth pitch Pi of the worm 47 is constant, a lead angle of the worm teeth 131 can be increased, and the thus-increased lead angle can reduce frictional loss between the worm 47 and the auxiliary worm wheel 49. The thus-reduced frictional loss allows the auxiliary worm wheel 49 to be rotated with smaller force. As a result, the worm gear mechanism 44 can operate with increased smoothness, and the durability of the worm gear mechanism 44 can be enhanced even further.

Part (c) of FIG. 8 is a sectional view taken along the c-c line of part (a) of FIG. 8, which particularly shows how the torque-transmitting worm wheel 48 meshes with the worm 47. Namely, the worm wheel 48 meshes with the worm 47 with a right surface 103b of the tooth 103 contacting a left surface 131a of the tooth 131 of the worm 47.

Part (d) of FIG. 8 is a sectional view taken along the d-d line of part (a) of FIG. 8, which particularly shows how the auxiliary worm wheel 49 meshes with the worm 47. Namely, the auxiliary worm wheel 49 meshes with the worm 47 with a left surface 113a of the tooth 113 contacting a right surface 131b of the tooth 131 of the worm 47.

Figure 9:
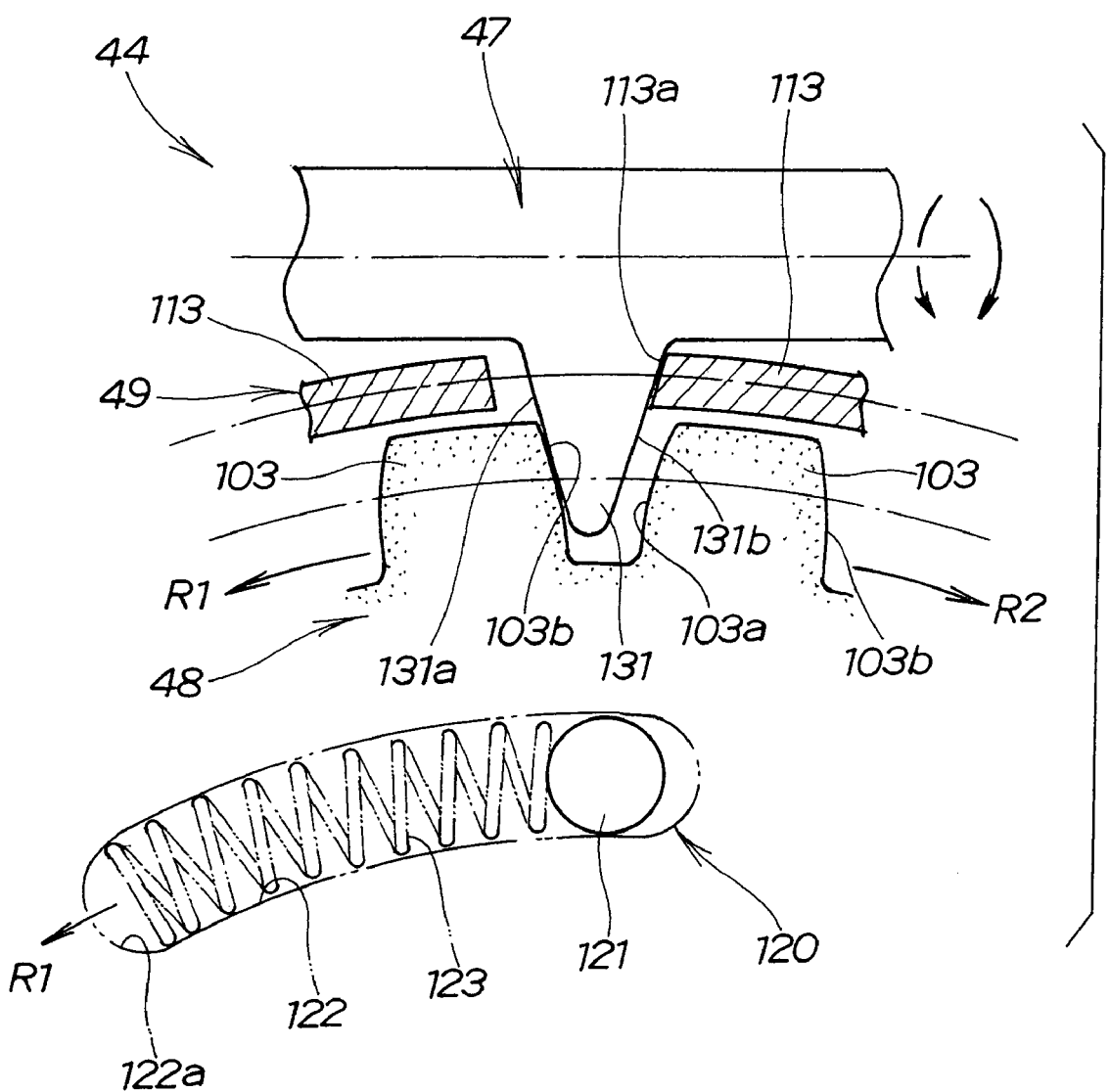
FIG. 9 is a view relationship among the teeth of the worm, torque-transmitting worm wheel and auxiliary worm wheel in the first embodiment of the worm gear mechanism, and the neutral position maintaining mechanism.

FIG. 9 is a schematic view of the first embodiment of the worm gear mechanism 44, which particularly shows the arrangements of part (c) and part (d) of FIG. 8 in combination.

At positions where the torque-transmitting worm wheel 48 and auxiliary worm wheel 49 mesh with the worm 47, the tooth 131 of the worm 47 is held at its opposite (left and right) surfaces 131a and 131b between the tooth 103 of the torque-transmitting worm wheel 48 and the tooth 113 of the auxiliary worm wheel 49, and the auxiliary worm wheel 49 is normally resiliently urged, via the compression spring 123 of each of the neutral position maintaining mechanisms 120, in such a direction as to keep the opposite (left and right) surfaces 131a and 131b of the worm tooth 131 between the teeth 103 and 113 (i.e., in a direction of arrow R1).

In other words, each of the neutral position maintaining mechanisms 120 serves to resiliently urge the auxiliary worm wheel 49 relative to the torque-transmitting worm wheel 48 in the direction of arrow R1, by means of the compression spring 123 fitted between the pin 121 projecting from the worm wheel 48 and the one end 122a of the elongated hole portion 122 of the worm wheel 49. With the urging force of the compression spring 123, the worm 47 can be resiliently kept in its neutral position with the tooth 131 held at its left and right surfaces 131a and 131b by the tooth 103 of the torque-transmitting worm wheel 48 that is located to the left of the tooth 131 and the tooth 113 of the auxiliary worm wheel 49 that is located to the right of the tooth 131. Thus, with the urging force, it is possible to eliminate backlash between the worm 47 and the worm wheels 48 and 49.

Next, a description will be given about behavior of the worm gear mechanism 44, with primary reference to FIG. 9. In FIG. 9, the tooth 131 of the worm 47 is shown as engaged in a tooth space (i.e., concave space between the left and right teeth 103 of the torque-transmitting worm wheel 48). In this state, a slight backlash (i.e., gap) is left between the tooth 131 of the worm 47 and the right tooth 103 of the torque-transmitting worm wheel 48.

As the worm 47 turns in the forward direction in the state of FIG. 9, the tooth 131 of the worm 47 presses the right surface 103b of the left tooth 103 of the torque-transmitting worm wheel 48 in the direction of arrow R1 (i.e., counterclockwise direction of FIG. 9) so that the worm wheel 48 is caused to rotate in the counterclockwise direction. During that time, no hitting sound is produced between the teeth 103 and 131. The auxiliary worm wheel 49 is rotated together with the torque-transmitting worm wheel 48 via the neutral position maintaining mechanisms 120.

On the other hand, as the worm 47 turns in the reverse direction in the state of FIG. 9, the tooth 131 of the worm 47 presses the left surface 113a of the tooth 113 of the auxiliary worm wheel 49 in a direction of arrow R2 (i.e., clockwise direction of FIG. 9) so that the worm wheel 49 is caused to rotate in the clockwise direction against the urging force of thee compression springs 123.

When the auxiliary worm wheel 49 has turned in the direction of arrow R2 through a given angle corresponding to the backlash (gap) left between the teeth 103 and 131, the right surface 131 of the tooth 131 of the worm 47 comes into contact with the left surface 103a of the right tooth 103 of the torque-transmitting worm wheel 48. At that time, the tooth 131 of the worm 47 gently contacts the tooth 103 of the torque-transmitting worm wheel 48 while pressing the tooth 113 of the auxiliary worm wheel 49 against the urging force of thee compression springs 123; thus, only small hitting sound is produced between the teeth 103 and 131.

As the worm 47 further turns in the reverse direction, the torque-transmitting worm wheel 48 is also rotated in the direction of arrow R2. In this case too, the auxiliary worm wheel 49 is rotated together with the torque-transmitting worm wheel 48 via the neutral position maintaining mechanisms 120.

The resilient urging force of the compression springs (resilient members) 123 may be set to an appropriate intensity. For example, the resilient urging force of the compression springs 123 may be set to such an intensity as to minimize hitting sound produced between the teeth 103 and 131 when the steering wheel of the electric power steering apparatus 10 (see FIG. 1) is turned by the driver during travel of the vehicle at high or medium speed; this is because it is preferable to minimize the hitting sound during travel of the vehicle at high or medium speed in order to achieve improved comfort in the vehicle compartment.

Namely, with the above-described inventive arrangements, it is possible to even further reduce hitting sound between the teeth 103 and 131.

Further, the face width of the torque-transmitting worm wheel 48 can be set to be symmetrical about the meshing region where the worm wheel 48 meshes with the worm 47 (i.e., about a centerline CW vertically passing the center of the worm 47 as illustrated in part (a) of FIG. 8.), as the worm 47 is viewed in the axial direction as in part (a) of FIG. 8.

In addition, the torque-transmitting worm wheel 48 can be formed integrally without a particular groove having to be formed for holding therein a backlash reducing component. Therefore, the instant embodiment can enhance a processing accuracy of the teeth 103 of the torque-transmitting worm wheel 48, thereby ensuring appropriate meshing engagement of the worm wheel 48 with the worm 47.

When, in the illustrated example of FIG. 9, the torque-transmitting worm wheel 48 has been rotated in the direction of arrow R2 through the reverse rotation of the worm 47, there is left a slight backlash (gap) between the tooth 131 of the worm 47 and the left tooth 103 of the worm wheel 48. Thus, hitting sound would occur between the teeth 103 and 131 when the worm 47 is then rotated in the forward direction.

To avoid such an inconvenience, the resilient urging force of the compression springs 123 in the instant embodiment is set to such an intensity as to minimize hitting sound produced between the teeth 103 and 131 when the steering wheel of the power steering apparatus 10 (see FIG. 1) is turned by the driver during travel of the vehicle at high or medium speed. Because only small steering assist torque suffices owing to the arrangements of the embodiment, the compression springs 123 may be of relatively small resilient urging force. Thus, under such steering conditions, the hitting sound produced between the teeth 103 and 131 when the worm 47 is rotated in the reverse direction can be minimized.

When relatively great steering assist torque is required, for example, to operate the steering wheel 21 while the vehicle is stationary (i.e., during stoppage of the vehicle), even a relatively loose anti-noise measure can properly combat noise sound in the vehicle compartment.

Next, a description will be given about a second embodiment of the worm gear mechanism of the present invention, with reference to FIGS. 10-16D. Same components as in the first embodiment of FIGS. 1-9 are represented by the same reference characters and will not be described in detail here to avoid unnecessary duplication; particularly, the same construction as illustrated in FIGS. 1-5 is employed in the second embodiment.

Figure 10:
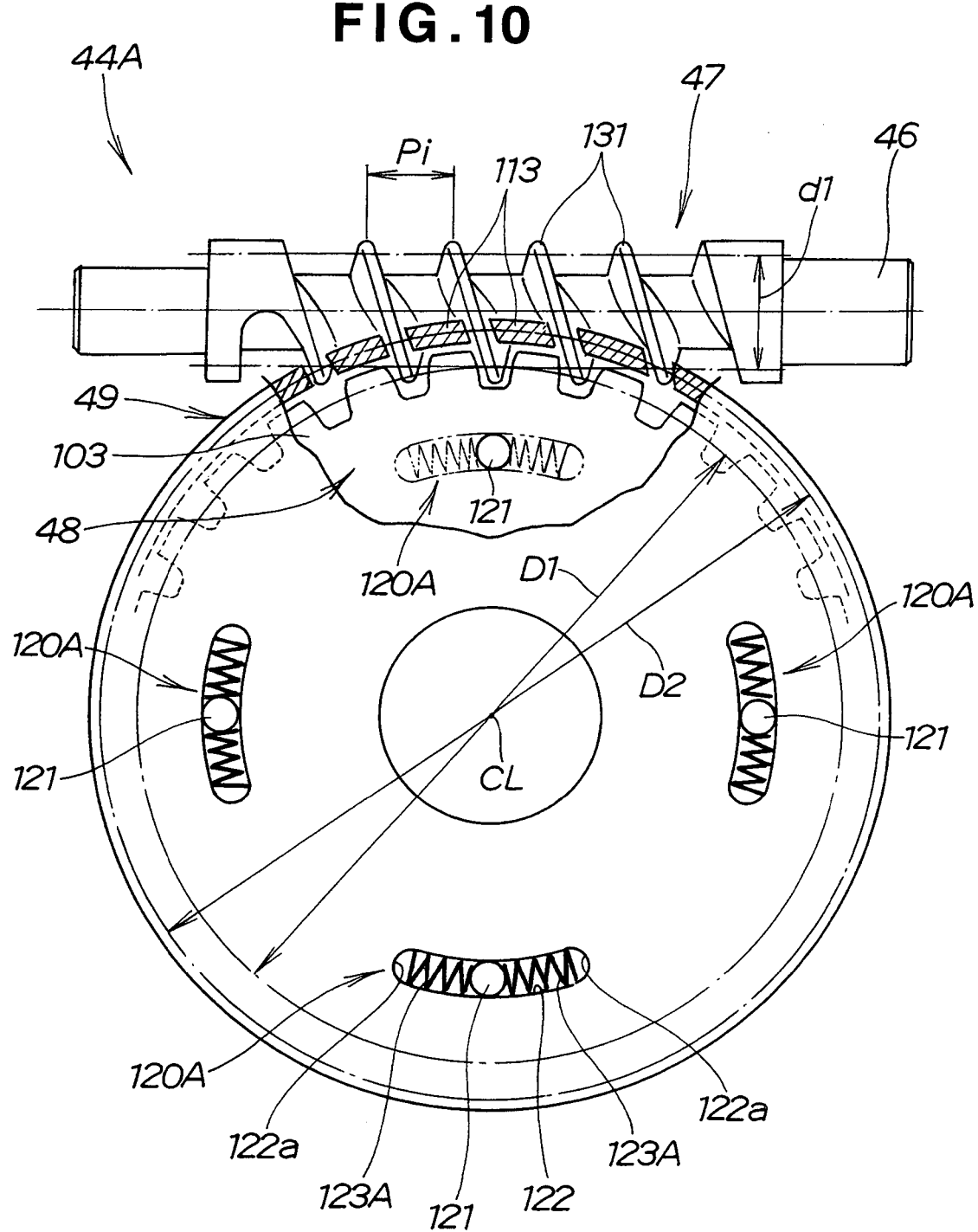
FIG. 10 is a partly-sectional plan view of a worm gear mechanism in accordance with a second embodiment of the present invention.

As illustrated in FIG. 10, each of a plurality of neutral position maintaining mechanisms 120A, included in the worm gear mechanism 44A, is constructed to resiliently urge the auxiliary worm wheel 49 in such a direction where the auxiliary worm wheel 49, having been rotated relative to the torque-transmitting worm wheel 48, rotates back to the original, neutral position.

Figure 11A:
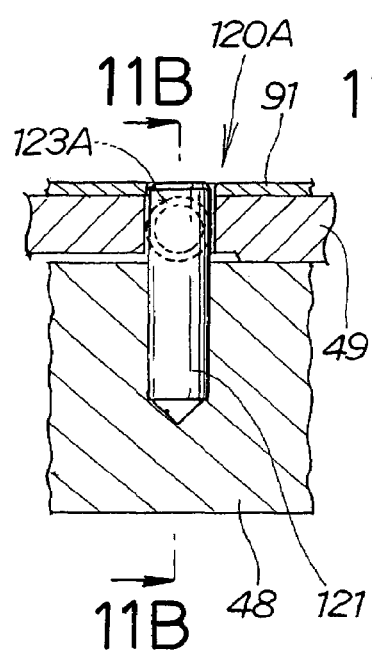
FIGS. 11A to 11C are sectional views showing an example of a neutral position maintaining mechanism employed in the second embodiment of the present invention.
Figure 11B:
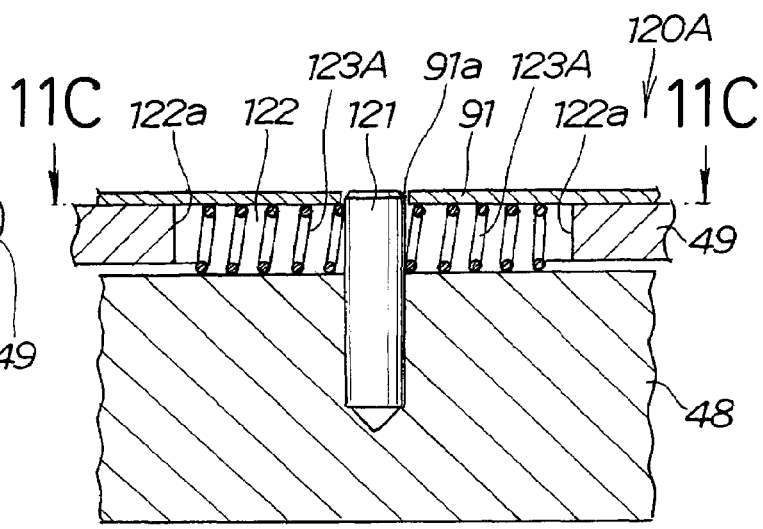
Figure 11C:
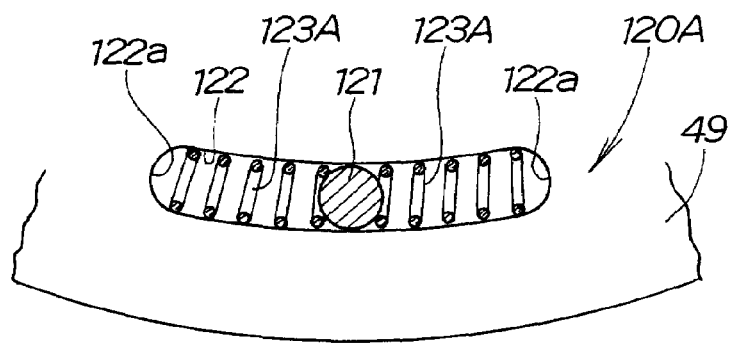
Figure 11D:
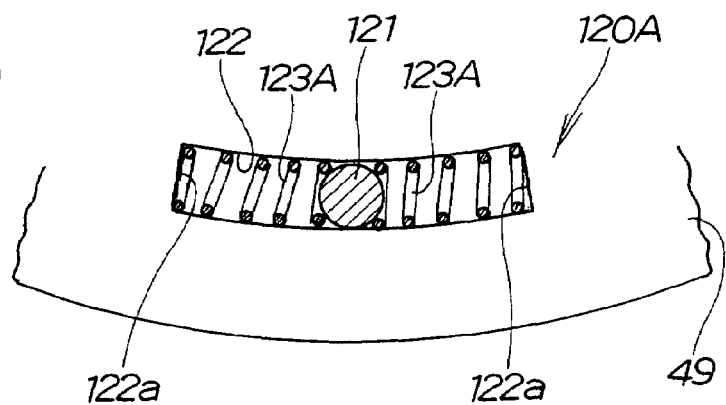
FIG. 11D is a view showing a modified example of an arcuate elongated hole portion in the neutral position maintaining mechanism.

The following paragraphs describe details of the neutral position maintaining mechanisms 120A, with reference to FIGS. 11A-11D. Note that FIG. 11D illustrates a modification of the neutral position maintaining mechanisms 120A.

Each of the neutral position maintaining mechanisms 120A in the second embodiment comprises an upright pin 121 of a circular cross section projecting from the upper surface of the torque-transmitting worm wheel 48, an arcuate elongated hole portion 122 formed through the thickness of the auxiliary worm wheel 49 and extending along the circumference of the wheel 49 in such a manner that the pin 121 is fitted in the hole portion 122 for sliding movement along the inner longitudinal edges of the hole portion 122, and a pair of compression springs 123A and 123B disposed between opposite ends 122a of the hole portion 122 and the pin 121; in the illustrated example, the opposite ends 122 are each shaped semi-circularly. The pin 121 is fitted and normally held in a longitudinally-middle portion of the hole portion 122 between the two compression springs 123A and 123B; namely, each of the compression springs 123A and 123B is disposed between one side of the pin 121 and one of the ends of the elongated hole portion 122.

In each of the neutral position maintaining mechanisms 120A constructed like this, the compression springs 123A and 123B normally urge the auxiliary worm wheel 49 in such a direction where the auxiliary worm wheel 49, having been rotated relative to the torque-transmitting worm wheel 48, rotates back to the original, neutral position.

As seen from the modified example of FIG. 11D, the opposite ends 122a of each of the hole portions 122 may be shaped flat.

Figure 12:
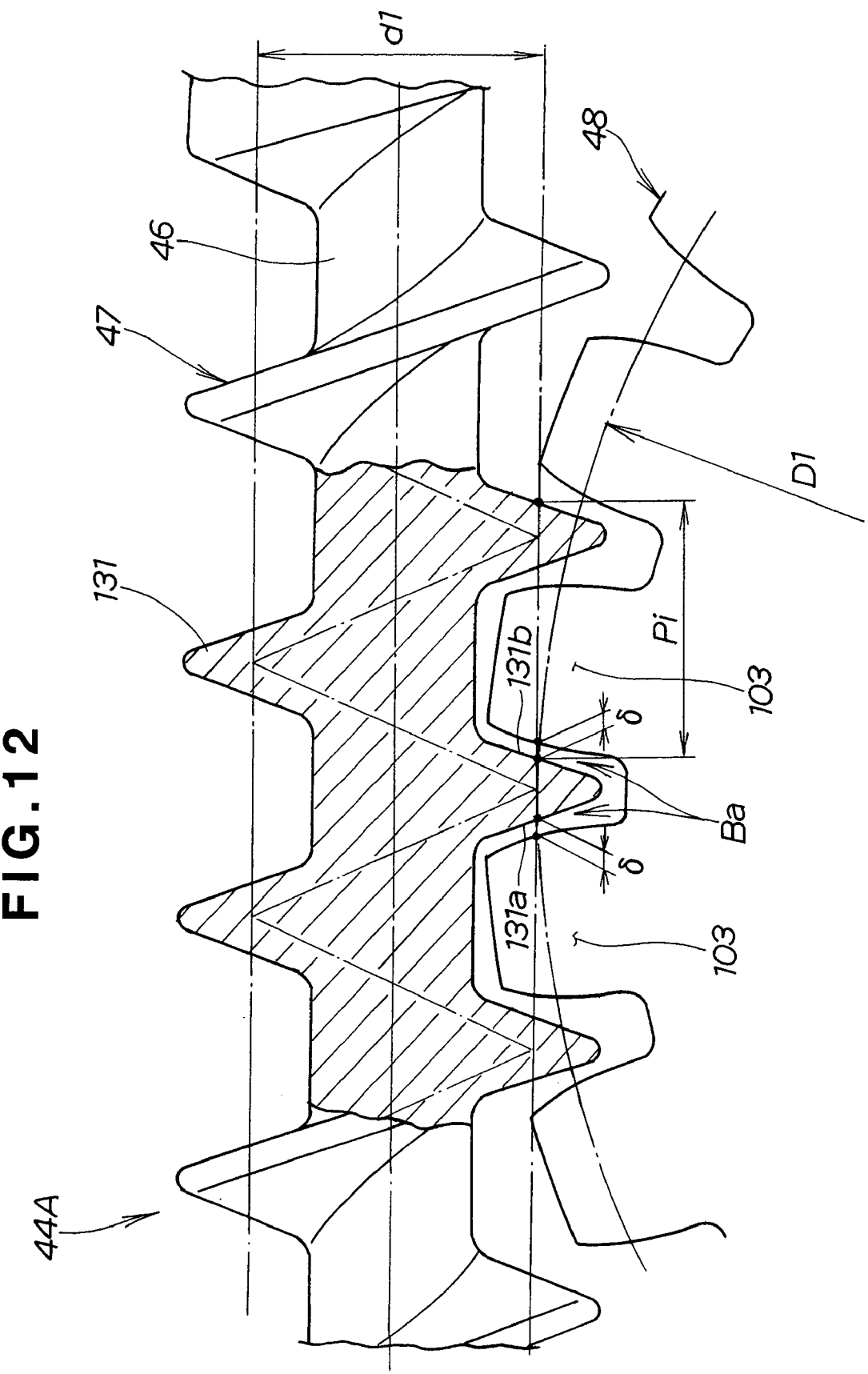
FIG. 12 is a view showing how a torque-transmitting worm wheel meshes with a worm in the second embodiment of the worm gear mechanism.

FIG. 12 shows how the torque-transmitting worm wheel 48 meshes with the worm 47 in the second embodiment. In the neutral position of the second embodiment of the worm gear mechanism 44A, the worm 47 and torque-transmitting worm wheel 48 mesh with each other in such a manner that substantially equal backlashes (gaps) δ are left between left and right surfaces 131a and 131b of a tooth 131 of the worm 47 and left and right teeth 103 of the worm wheel 48. Namely, in the neutral position, the left and right teeth 103 of the torque-transmitting worm wheel 48 are kept out of contact with the tooth 131 of the worm 47.

FIG. 13 shows how the auxiliary worm wheel 49 meshes with the worm 47 in the second embodiment. As clearly seen in FIGS. 14A to 14C, the second embodiment of the worm gear mechanism 44A is characterized in that the auxiliary worm wheel 49 can mesh with the worm 47 with no backlash (gap).

Basic principles of the second embodiment will be described below with reference to FIGS. 15A and 15B.

Figure 15A:
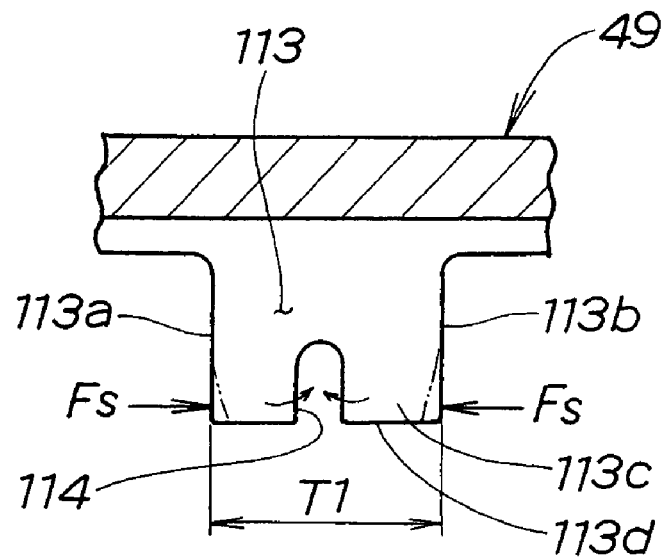
FIGS. 15A and 15B are principle views showing relationship between the worm and auxiliary worm wheel in the second embodiment of the worm gear mechanism.

As seen FIG. 15A, each tooth 113 of the auxiliary worm wheel 49 has a substantial rectangular shape as viewed in a radial direction from the rotation center of the auxiliary worm wheel 49. Further, each tooth 113 of the auxiliary worm wheel 49 has a distal end portion (or tooth top portion) 113c resiliently deformable in the tooth thickness direction. Specifically, each tooth 113 has a deformation promoting portion 114 to permit resilient deformation, in the tooth thickness direction (left-and-right direction in the figure), of the tooth top portion. The deformation promoting portion 114 is, for example, in the form of a recess formed in a tooth top surface (or top land) 113d substantially centrally of the tooth thickness and extending through the face width (i.e., in a direction perpendicular to the sheet of the drawing). Therefore, when compression force Fs acts on the left and right tooth surfaces 113a and 113b in the tooth thickness direction, the tooth 113 can be deformed resiliently in the tooth thickness direction as depicted by imaginary lines.

Any desired shape, dimensions and position of the deformation promoting portion 114 may be chosen as long as it promotes resilient deformation, in the tooth thickness direction, of the tooth top portion 113c.

Figure 15B:
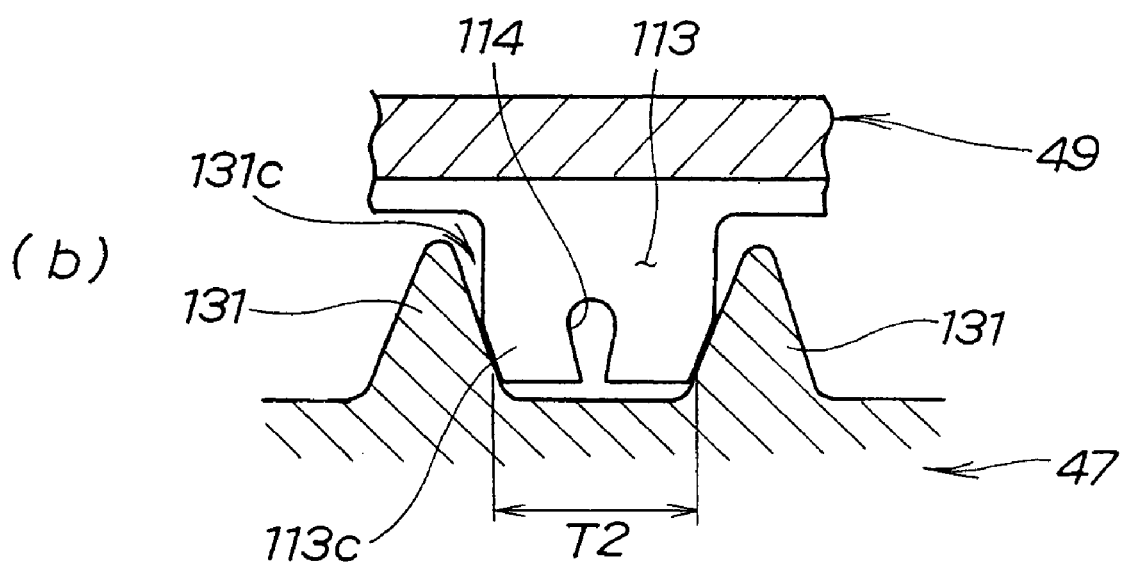
Figure 19A:
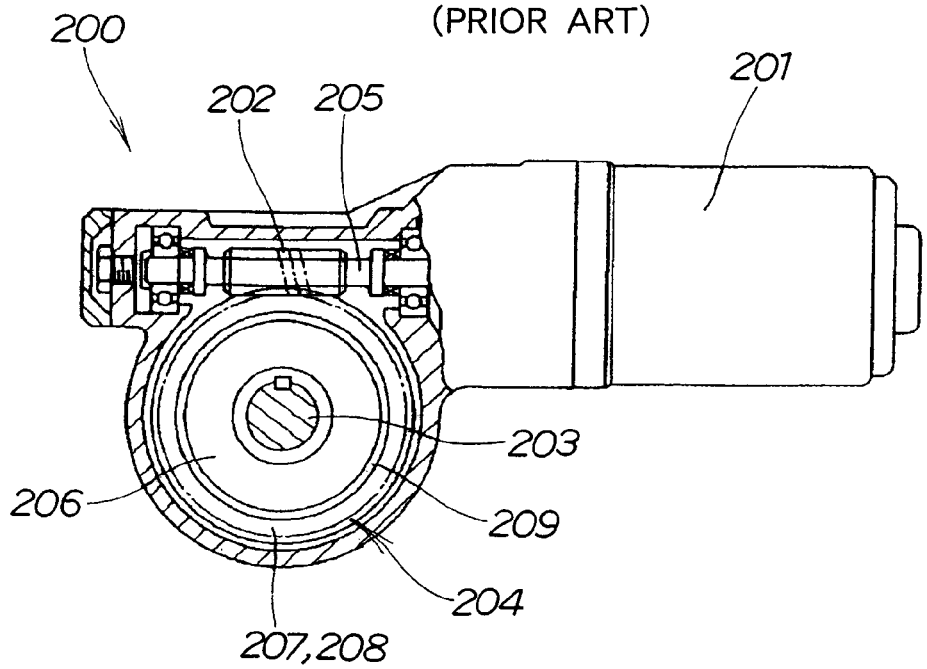
FIGS. 19A to 19C are views outlining a first example of a conventionally-known worm gear mechanism.
Figure 19B:
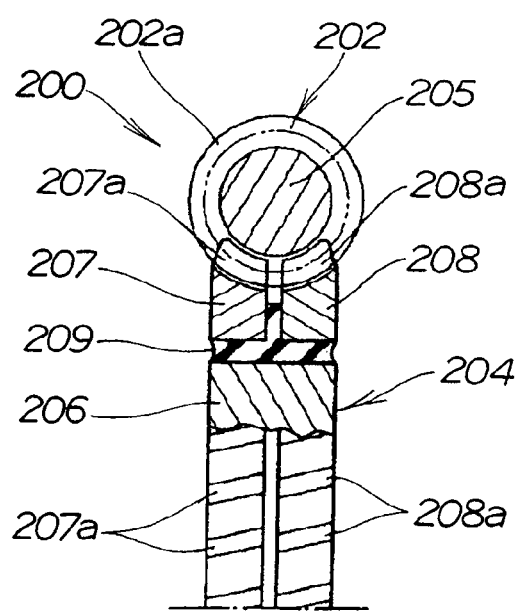
Figure 19C:
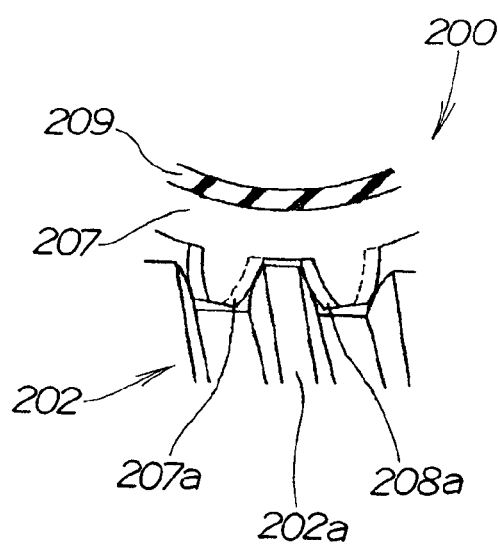
Figure 20A:
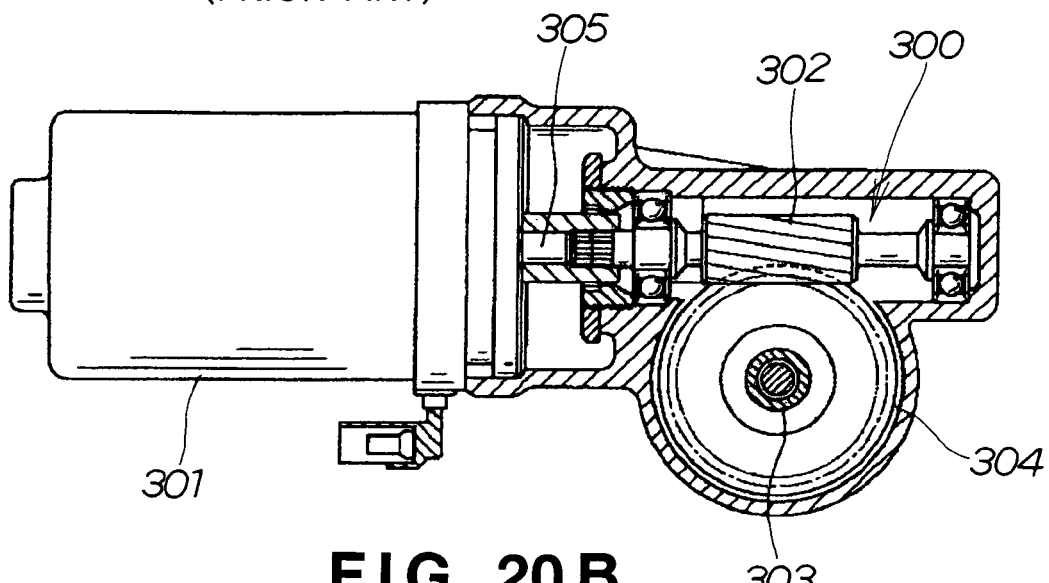
FIGS. 20A and 20B are views outlining a second example of a conventionally-known worm gear mechanism.
Figure 20B:
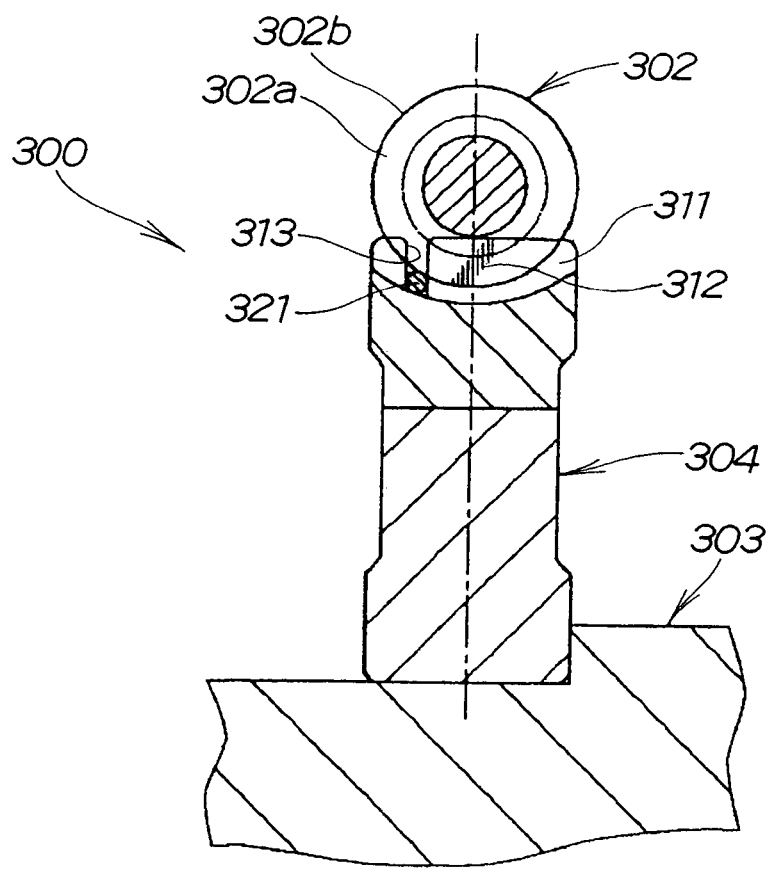

Let's now consider behavior of the worm gear mechanism 44A when the tooth 113 of a tooth thickness T1 is engaged between adjacent teeth 131 of the worm 47, i.e. tooth space 131c, as illustrated in FIG. 15B. The thickness T1 of the tooth 113 is greater than a distance T2 between roots of adjacent teeth 131 of the worm 47 (i.e., T1>T2).

As the tooth 113 of the auxiliary worm wheel 49 is pressed into the tooth space 131c, the tooth 113 is compressed and resiliently deformed inward in the tooth thickness direction, so that the tooth thickness at the top portion of the tooth 113 decreases from T1 to T2. Namely, each tooth 113 of the auxiliary worm wheel 49 is constructed to deform inward in the tooth thickness direction as it is meshed between the teeth 131 of the worm 47 with no gap. Such resilient deformation, in the tooth thickness direction, of the tooth 113 can readily accommodate manufacturing and tooth-meshing errors of the worm 47 and auxiliary worm wheel 49, so that the worm gear mechanism 44A can be manufactured with increased productivity although the mechanism 44A is of the type where the auxiliary worm wheel 49 meshes with the worm 47 with no backlash.

In addition, the teeth 113 of the auxiliary worm wheel 49 can contact with the teeth 131 of the worm 47 uniformly during relative rotation between the worm wheel 49 and the worm 47, which can properly reduce the contact pressure when the auxiliary worm wheel 49 is rotated by the worm 47. As a consequence, the inventive arrangements can even further enhance the durability of the worm gear mechanism 44A (see FIG. 14A).

Figure 14A:
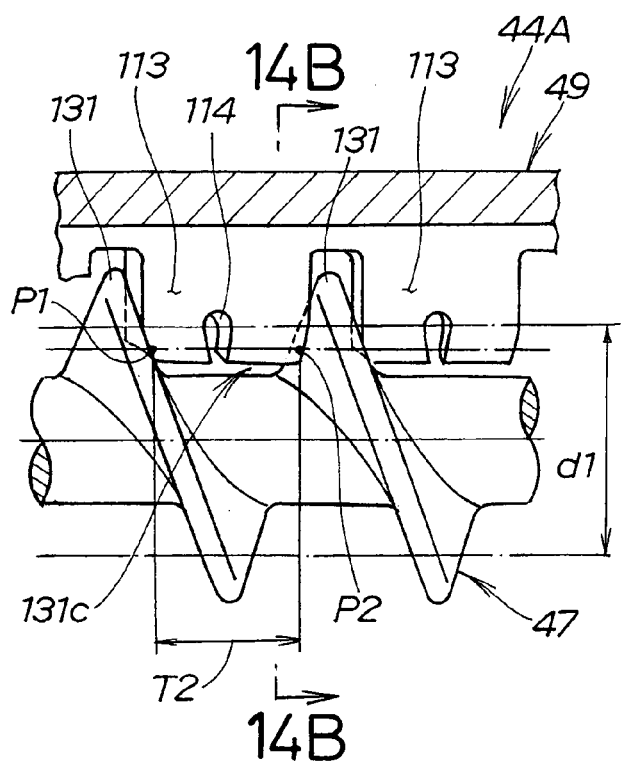
FIGS. 14A to 14C are views showing relationship between teeth of the worm and auxiliary worm wheel in the second embodiment of the worm gear mechanism.
Figure 14B:
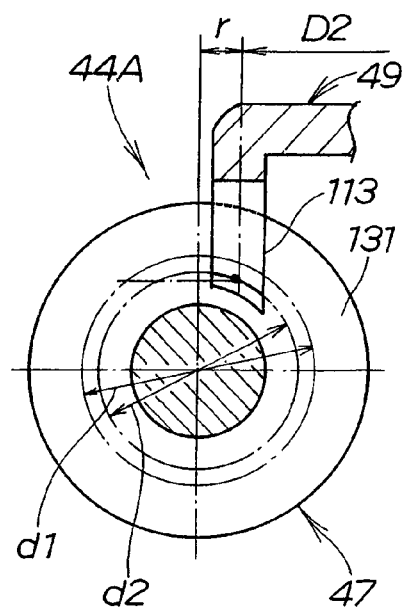
Figure 14C:
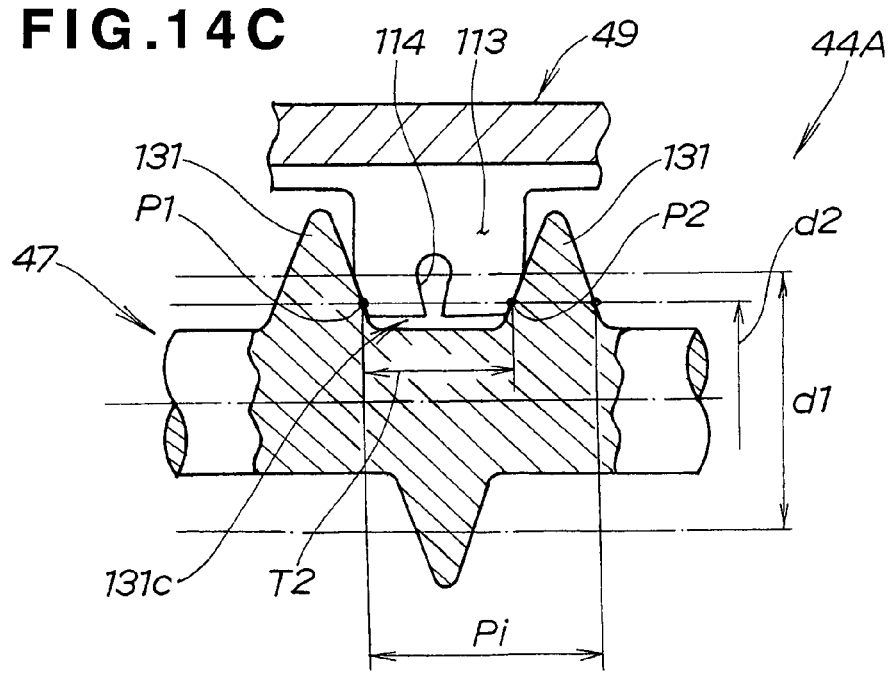

As seen in FIGS. 14A to 14C, the tooth 113 of the auxiliary worm wheel 49 is compressed and resiliently deformed inward in the tooth thickness direction as the tooth 113 is pressed into the tooth space 131c for meshing engagement with the teeth 131 of the worm 47. As a consequence, the tooth 113 meshes with the teeth 131 of the worm 47 at points P1 and P2. Distance between the meshing points P1 and P2 is represented by T2, which is equal to the distance T2 between the roots of adjacent teeth 131.

Thus, in the second embodiment arranged in the foregoing manner, the auxiliary worm wheel 49 can mesh with the worm 47 with no backlash d2 represents a pitch diameter of the worm 47 defined when the auxiliary worm wheel 49 is in meshing engagement with the worm 47 at the points P1 and P2. The pitch diameter d2 is set to be smaller than a pitch diameter d1 of the worm 47 defined when the torque-transmitting worm wheel 48 is in meshing engagement with the worm 47 (i.e., d1>d2).

Next, a description will be given about behavior of the second embodiment of the worm gear mechanism 44A with primary reference to FIGS. 16A to 16D. FIGS. 16A and 16B show the worm gear mechanism 44A in the neutral position, and FIGS. 16C and D show the gears in meshing engagement with each other.

In the neutral position, as illustratively shown in FIG. 16A, two adjacent (i.e., left and right) teeth 103 of the torque-transmitting worm wheel 48 mesh with a tooth 131 of the worm 47 with left and right backlashes (gaps) Ba substantially equal to each other.

Such meshing engagement between the teeth 103 and the tooth 131 is maintained by the auxiliary worm wheel 49 meshing with the worm 47 with no backlash, through action of the neutral position maintaining mechanism 120A. Thus, in the neutral position, the left and right teeth 103 of the torque-transmitting worm wheel 48 are kept out of contact with the tooth 131 of the worm 47. Thus, there occurs no friction torque between the teeth 131 and the tooth 103 when the worm 47 starts rotating.

As the worm 47 rotates in the forward direction from the neutral position, the tooth 131 of the worm 47 angularly moves, against the resilient urging force of the right compression spring 123A of each of the neutral position maintaining mechanisms 120, while pressing the right surface 113b of the left tooth 113 of the auxiliary worm wheel 49 in a direction of arrow R1 (i.e., counterclockwise direction of FIG. 16A). FIGS. 16C and D show the result of the angular movement of the tooth 131 of the worm 47.

FIG. 16C shows the tooth 131 of the worm 47 having contacted the teeth 103 of the torque-transmitting worm wheel 48. As the auxiliary worm wheel 49 turns through an angle corresponding to the backlash Ba, the left surface 131a of the tooth 131 of the worm 47 comes into contact with the right surface 103b of the left tooth 103 of the torque-transmitting worm wheel 48.

In this case, the tooth 131 of the worm 47 gently comes into contact with the tooth 103 of the torque-transmitting worm wheel 48 while pressing the tooth 113 of the auxiliary worm wheel 49 against the urging force of the right compression spring 123A, and thus only small hitting sound is produced between the teeth 103 and 131.

Then, as the worm 47 turns in the reverse direction from the above position, the tooth 131 of the worm 47 presses the left surface 113a of the right tooth 113 of the auxiliary worm wheel 49 in a direction of arrow R2 (clockwise direction in the figure) to thereby rotate the worm wheel 49 in that direction with the right compression spring 123A returning to the original position. As a consequence, the worm gear mechanism 44A returns to the original, neutral position sown in FIGS. 16A and 16B.

Then, as the worm 47 further turns in the reverse direction, the two worms 49 and 48 are rotated in the direction of arrow R2 (clockwise direction in the figure) in the same manner as explained earlier in relation to FIG. 16C.

The resilient urging force of the compression springs (resilient members) 123A may be set to an appropriate intensity. For example, the resilient urging force of the compression springs 123A may be set to such an intensity as to minimize hitting sound produced between the teeth 103 and 131 when the steering wheel of the power steering apparatus 10 (see FIG. 1) is turned by the driver during travel of the vehicle at high or medium speed; this is because it is preferable to minimize the hitting sound during travel of the vehicle at high or medium speed in order to achieve improved comfort in the vehicle compartment.

With the above-described arrangements, the second embodiment 44A can effectively reduce the hitting sound between the teeth 103 and 131 of the worm 47 and torque-transmitting worm wheel 48.

Further, the face width of the torque-transmitting worm wheel 48 can be set to be symmetrical about the meshing region where the worm wheel 48 meshes with the worm 47, as the worm 47 is viewed in the axial direction as in the first embodiment 44 shown in part (a) of FIG. 8. In addition, the torque-transmitting worm wheel 48 can be formed integrally without a particular groove having to be formed for holding therein a backlash reducing component. Therefore, the instant embodiment too can enhance a processing accuracy of the teeth 103 of the torque-transmitting worm wheel 48, thereby maintaining appropriate meshing engagement of the worm wheel 48 with the worm 47.

Further, the second embodiment of the gear mechanism 44A is characterized in that the auxiliary worm wheel 49 meshes with the worm 47 with no backlash (gap) and that each of the neutral position maintaining mechanisms 120 has the two resilient urging members 123A for imparting the auxiliary worm wheel 49 with a resilient force to return the wheel 49 back to its original, neutral position after the two worm wheels have rotated relative to each other.

Therefore, while the tooth 113 of the auxiliary worm wheel 49 is meshed between the teeth 131 of the worm 47 with no backlash (gap), the auxiliary worm wheel 49 can be always resiliently urged back to the original, neutral position relative to the torque-transmitting worm wheel 48.

Therefore, the worm 47 can first start rotating the auxiliary worm wheel 49 against the resilient urging force of the resilient members 123A and then start rotating the torque-transmitting worm wheel 48 while rotating the auxiliary worm wheel 49. As a consequence, the tooth 131 of the worm 47 can be brought into gentle contact with the teeth 103 of the torque-transmitting worm wheel 48, which thereby achieves even further enhanced durability of the worm gear mechanism 44A.

In the neutral position of the worm gear mechanism 44A and at the beginning of rotation of the worm 47, there occurs no frictional torque between the worm 47 and the torque-transmitting worm wheel 48, so that the durability, wear resistance in particular, can be enhanced even further. Further, where the worm gear mechanism 44A is employed in the electric power steering apparatus 10 of FIG. 1, it is possible to enhance the steering feel when the steering wheel 21 is turned back by the driver.

In the case where the above-described first or second embodiment of the worm gear mechanism 44 or 44A is employed in the electric power steering apparatus 10 of FIG. 1, there can be accomplished various benefits as follows.

In the electric power steering apparatus 10 where the worm gear mechanism 44 or 44A is employed as a mechanism for transmitting steering assist torque, produced by the electric motor 43, to the steering system 20, it is possible to enhance the durability of the worm gear mechanism 44 or 44A with undesired backlash minimized.

The elimination of backlash in the worm gear mechanism 44 or 44A can minimize hitting sound produced between the worm and wheel teeth due to driver's steering operation of the steering wheel 21, thereby minimizing noise sound in the vehicle compartment.

Further, the elimination of backlash in the worm gear mechanism 44 or 44A can maintain appropriate meshing engagement of the torque-transmitting worm wheel 48 with the worm 47. Thus, the inventive arrangements can prevent an unwanted time delay when the steering assist torque is transmitted via the worm gear mechanism 44 or 44A to the steering system 20 in response to turning-back operation, by the vehicle driver, of the steering wheel 21. Further, because the elimination of backlash permits gentle contact between the teeth as the torque-transmitting worm wheel 48 is rotated by the worm 47, the steering wheel 21 can be turned back smoothly and appropriately.

In this way, the inventive arrangements can achieve an even further improved steering feel of the electric power steering apparatus 10.

Note that the worm gear mechanisms 44 and 44A can each be further simplified in construction by dispensing with the neutral position maintaining mechanisms 120 of the first embodiment or neutral position maintaining mechanisms 120A of the second embodiment, as will be set forth hereinbelow with reference to FIGS. 17 and 18. In FIGS. 17 and 18, substantially the same components as in FIGS. 1-16 are represented by the same reference characters and will not be described in detail here to avoid unnecessary duplication.

Third embodiment of the worm gear mechanism 44B illustrated in FIG. 17 and a fourth embodiment of the worm gear mechanism 44C illustrated in FIG. 18 are each characterized in that: (1) the auxiliary worm wheel 49 meshes with the worm 47 with a backlash left between its tooth 113 and the tooth 131 of the worm 47 that is smaller than a backlash left between the tooth 103 of the torque-transmitting worm wheel 48 and the tooth 131 of the worm 47; and (2) the auxiliary worm wheel 49 is resiliently urged, via a leaf spring 115 as a resilient member, toward the torque-transmitting worm wheel 48. Such arrangements can significantly simplify the construction of the worm gear mechanisms described above.

The third embodiment of the worm gear mechanism 44B illustrated in FIG. 17 is further characterized in that the auxiliary worm wheel 49 is mounted in such a manner that it can slidingly rotate relative to the torque-transmitting worm wheel 48. During the relative rotation, respective rotation timing of the two worm wheels 48 and 49 can be shifted from each other using a sliding frictional force produced therebetween. As a result, the tooth of the worm 47 can be brought into gentle contact with the tooth of the torque-transmitting worm wheel 48.

The fourth embodiment of the worm gear mechanism 44C illustrated in FIG. 18 is further characterized in that the auxiliary worm wheel 49 is mounted at its central portion to the torque-transmitting worm wheel 48 in such a manner that its rotation is limited in the following manner. As the rotational force of the worm 47 is transmitted to the auxiliary worm wheel 49, an axial component force, corresponding to a pressure angle of the tooth of the worm 47, acts on the worm wheel 49. This axial component force is a force acting to displace the tooth top portion of the auxiliary worm wheel 49 radially outward of the worm 47 (i.e., in a direction of arrow R3). With such an axial component force, the auxiliary worm wheel 49 is displaced in the direction of arrow R3 against the urging force of the leaf spring 115. Namely, in this case, the urging force of the leaf spring 115 functions as a resistance to the axial component force. Using the resistance of the leaf spring 115, the respective rotation timing of the two worm wheels 48 and 49 can be shifted from each other. As a result, the tooth of the worm 47 can be brought into gentle contact with the tooth of the torque-transmitting worm wheel 48.

In the second embodiment of the worm gear mechanism 44A, degree of the resilient deformation of the teeth 113 of the auxiliary worm wheel 49 may be chosen as desired, provided that the worm wheel 49 can be rotated by means of the worm 47 until the tooth 131 of the worm 47 contact the teeth 103 of the torque-transmitting worm wheel 48. Furthermore, the deformation promoting portion 114 need not necessarily be formed in each of the teeth 113, provided that the teeth 113 themselves are formed of a material resiliently deformable in the tooth thickness direction.

In the present invention, the worm gear mechanisms 44, 44A should not be construed as limited to the construction where the auxiliary worm wheel 49 is provided on the same rotation axis as the torque-transmitting worm wheel 48 for relative rotation to the worm wheel 48.

Further, in the worm gear mechanisms 44, 44A, the resilient members are not limited to the compression springs as described in relation to the preferred embodiments as long as they can serve to normally urge the auxiliary worm wheel 49 toward the original, neutral position.

Furthermore, the electric motor in the electric power steering apparatus should not be construed as limited to the construction for generating steering assist torque corresponding to detected steering torque. For example, where the electric power steering apparatus is of a steer-by-wire type, the electric motor may be constructed to generate all necessary torque for steering the steerable road wheels. In any case, the electric power steering apparatus only has to be constructed in such a manner that torque generated by the motor is transmitted via the worm gear mechanism to the steering system.

Obviously, various minor changes and modifications of the present invention are possible in the light of the above teaching. It is therefore to be understood that within the scope of the appended claims the invention may be practiced otherwise than as specifically described.

What is claimed is:

1. A worm gear mechanism comprising:
   a driving worm;
   a torque-transmitting worm wheel meshing with said worm for transmitting torque from said worm to a load side;
   an auxiliary worm wheel meshing with said worm and having a pitch diameter greater than a pitch diameter of said torque-transmitting worm wheel; and
   a resilient member for resiliently urging said auxiliary worm wheel relative to said torque-transmitting worm wheel, wherein, at positions where said torque-transmitting worm wheel and said auxiliary worni wheel mesh with said worm, a tooth of said worm is held at opposite surfaces thereof between teeth of said torque-transmitting worm wheel and said auxiliary worm wheel, and wherein said resilient member resiliently urges said auxiliary worm wheel in such a direction as to keep the tooth of said worm held between the teeth, wherein a pitch diameter of said worm defined when said auxiliary worm wheel is meshing with said worm is smaller than a pitch diameter of said worm defined when said torque transmitting worm wheel is meshing with said worm.

2. A worm gear mechanism as claimed in claim 1 wherein said auxiliary worm wheel is rotatable relative to said torque-transmitting worm wheel about a same rotation center as said torque-transmitting worm wheel.

3. An electric power steering apparatus for use in a vehicle, said electric power steering apparatus comprising:
   a worm gear mechanism;
   a steering system extending from a steering wheel to a steerable road wheel of the vehicle; and
   an electric motor for generating steering assist torque to assist steerage of the steerable road wheel in response to steering operation of the steering wheel or all necessary torque for steerage of the steerable road wheel, and supplying the steering assist torque or all necessary torque to said steering system via said worm gear mechanism; said worm gear mechanism comprising:
   a driving worm;
   a torque-transmitting warm wheel meshing with said worm for transmitting torque from said worm to a load side;
   an auxiliary worm wheel meshing with said worm and having a pitch diameter greater than a pitch diameter of said torque-transmitting wonn wheel; and
   a resilient member for resiliently urging said auxiliary worm wheel relative to said torque-transmitting worm wheel, wherein, at positions where said torque-transmitting worm wheel and said auxiliary wonn wheel mesh with said worm, a tooth of said worm is held at opposite surfaces thereof between teeth of said torque-transmitting worm wheel and said auxiliary worm wheel, and wherein said resilient member resiliently urges said auxiliary wonn wheel in such a direction as to keep the tooth of said worm held between the teeth, wherein a pitch diameter of said worm defined when said auxiliary worm wheel is meshing with said worm is smaller than a pitch diameter of said worm defined when said torque-transmitting worm wheel is meshing with said worm.

4. An electric power steering apparatus as claimed in claim 3 wherein said auxiliary worm wheel is rotatable relative to said torque-transmitting worm wheel about a same rotation center as said torque-transmitting worm wheel.

5. A worm gear mechanism comprising:
   a driving worm;
   a torque-transmitting worm wheel meshing with said worm for transmitting torque from said worm to a load side;
   an auxiliary worm wheel meshing with said worm and having a pitch diameter greater than a pitch diameter of said torque-transmitting worm wheel
   the torque-transmitting worm wheel meshing with said driving worm at a first position;
   the auxiliary worm wheel meshing with said driving worm at a second position, wherein said second position is radially outside said first position; and
   a resilient member for resiliently urging said auxiliary worm wheel relative to said torque-transmitting worm wheel, wherein, at positions where said torque-transmitting worm wheel and said auxiliary worm wheel mesh with said worm, a tooth of said worm is held at opposite surfaces thereof between teeth of said torque-transmitting worm wheel and said auxiliary worm wheel, and wherein said resilient member resiliently urges said auxiliary worm wheel in such a direction as to keep the tooth of said worm held between the teeth.

6. The worm gear mechanism according to claim 5, wherein said auxiliary worm wheel includes teeth configured in an axial direction of said auxiliary worm wheel.

* * * * *